US012772238B2

(12) United States Patent
Huang et al.

(10) Patent No.: US 12,772,238 B2
(45) Date of Patent: Oct. 20, 2026

(54) TECHNIQUES FOR SKIPPING PUSCH OCCASIONS WITH MULTIPLE CODEWORDS

(71) Applicant: QUALCOMM Incorporated, San Diego, CA (US)

(72) Inventors: Yi Huang, San Diego, CA (US); Jing Sun, San Diego, CA (US); Mostafa Khoshnevisan, San Diego, CA (US); Peter Gaal, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/521,811

(22) Filed: Nov. 28, 2023

(65) Prior Publication Data

US 2024/0284450 A1 Aug. 22, 2024

Related U.S. Application Data

(60) Provisional application No. 63/485,856, filed on Feb. 17, 2023.

(51) Int. Cl.

| | |
|---|---|
| ***H04W 72/1268*** | (2023.01) |
| ***H04L 1/00*** | (2006.01) |
| ***H04W 72/21*** | (2023.01) |

(52) U.S. Cl.

CPC ....... *H04W 72/1268* (2013.01); *H04L 1/0003* (2013.01); *H04W 72/21* (2023.01)

(58) Field of Classification Search

CPC .. H04W 72/1268; H04W 72/21; H04L 1/0003

See application file for complete search history.

(56) References Cited

U.S. PATENT DOCUMENTS

2015/0156770 A1* 6/2015 Beluri .................... H04L 5/0055 370/329

2015/0249984 A1* 9/2015 Papasakellariou ... H04B 7/0452 370/329

(Continued)

FOREIGN PATENT DOCUMENTS

EP 4597898 A1 * 8/2025 ........... H04L 5/0053

OTHER PUBLICATIONS

International Search Report and Written Opinion—PCT/US2024/011832—ISA/EPO—Aug. 5, 2024.

(Continued)

*Primary Examiner* — Michael A Keller

*Assistant Examiner* — Chhian (Amy) Ling

(74) *Attorney, Agent, or Firm* — QUALCOMM Incorporated

(57) ABSTRACT

Methods, systems, and devices for wireless communications are described. A user equipment (UE) may receive radio resource control (RRC) signaling that indicates (e.g., schedules, configures) resources for a set of physical uplink control channel (PUSCH) transmission occasions, each of the PUSCH transmission occasions configured with a capacity for transmission of a maximum quantity of transport blocks (TBs), the maximum quantity including two or more TBs. The UE may generate a PUSCH message in accordance with the RRC signaling, where the PUSCH message includes one or more TBs, the one or more TBs being less than the maximum quantity of TBs, and may transmit the PUSCH message within a PUSCH transmission occasion of the set of PUSCH transmission occasions.

30 Claims, 18 Drawing Sheets

(56) References Cited

U.S. PATENT DOCUMENTS

| | | | | |
|---|---|---|---|---|
| 2019/0150183 | A1* | 5/2019 | Aiba | H04L 1/0026 370/336 |
| 2019/0200381 | A1* | 6/2019 | Wu | H04L 1/1671 |
| 2020/0178288 | A1* | 6/2020 | Chang | H04W 76/27 |
| 2020/0295812 | A1* | 9/2020 | Rahman | H04B 7/0695 |
| 2022/0046677 | A1 | 2/2022 | Talarico et al. | |

OTHER PUBLICATIONS

LG Electronics: "Discussion on Intra-UE Multiplexing/Prioritization", 3GPP TSG RAN WG1 #104bis-e, R1-2103350, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 18 Pages, XP052178104, section 2.3.

Partial International Search Report—PCT/US2024/011832—ISA/EPO—May 14, 2024.

Samsung: "Configured Grant Enhancement for NR-U", 3GPP TSG RAN WG1 #102-e, R1-2006098, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020, XP052347472, 4 pages, section 3.

* cited by examiner

TECHNIQUES FOR SKIPPING PUSCH OCCASIONS WITH MULTIPLE CODEWORDS

CROSS REFERENCE

The present Application for Patent claims the benefit of U.S. Provisional Patent Application No. 63/485,856 by HUANG et al., entitled "TECHNIQUES FOR SKIPPING PUSCH OCCASIONS WITH MULTIPLE CODEWORDS," filed Feb. 17, 2023, assigned to the assignee hereof, and expressly incorporated by reference herein.

FIELD OF TECHNOLOGY

The following relates to wireless communications, including techniques for skipping physical uplink shared channel (PUSCH) occasions with multiple codewords (CWs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless networks, a UE may receive a configured grant physical uplink shared channel (CG-PUSCH) that includes a set of multiple physical uplink shared channel (PUSCH) transmission occasions usable by the UE for transmitting PUSCH messages. In some cases, the PUSCH transmission occasions may be associated with multiple transport blocks (TBs) or codewords (CWs).

SUMMARY

The described techniques relate to improved methods, systems, devices, and apparatuses that support techniques for skipping physical uplink shared channel (PUSCH) occasions with multiple codewords (CWs). Generally, aspects of the present disclosure are directed to configurations and mechanisms that enable user equipments (UEs) to drop subsets of transport blocks (TBs) from physical uplink control channel (PUSCH) messages communicated in PUSCH occasions configured for multiple TBs. In other words, aspects of the present disclosure are directed to rules and signaling that enable UEs to transmit PUSCH messages that include only a subset of TBs of a set of TBs enabled for a respective PUSCH occasion. For example, a UE may receive a configured grant PUSCH (CG-PUSCH) configuration that includes (e.g., indicates, configures, schedules) a set of multiple PUSCH occasions usable by the UE for transmitting PUSCH messages. In this example, each PUSCH occasion may be associated with (e.g., configured for, scheduled with) multiple TBs, such as TB1 and TB2. If the UE has only a small amount of data to be transmitted, the UE may transmit a PUSCH message within a PUSCH occasion, where the PUSCH message includes only TB1 (and omits or drops TB2).

A method is described. The method may include receiving radio resource control (RRC) signaling that indicates (e.g., schedules, configures) resources for a set of multiple uplink shared channel transmission occasions, each of the set of multiple uplink shared channel transmission occasions configured with a capacity for transmission of a maximum quantity of TBs, the maximum quantity including two or more TBs, generating an uplink shared channel message in accordance with the RRC signaling, where the uplink shared channel message includes one or more TBs, the one or more TBs being less than the maximum quantity of TBs, and transmitting the uplink shared channel message within an uplink shared channel transmission occasion of the set of multiple uplink shared channel transmission occasions.

An apparatus is described. The apparatus may include a processor, memory coupled with the processor, and instructions stored in the memory. The instructions may be executable by the processor to cause the apparatus to receive RRC signaling that indicates (e.g., schedules, configures) resources for a set of multiple uplink shared channel transmission occasions, each of the set of multiple uplink shared channel transmission occasions configured with a capacity for transmission of a maximum quantity of TBs, the maximum quantity including two or more TBs, generate an uplink shared channel message in accordance with the RRC signaling, where the uplink shared channel message includes one or more TBs, the one or more TBs being less than the maximum quantity of TBs, and transmit the uplink shared channel message within an uplink shared channel transmission occasion of the set of multiple uplink shared channel transmission occasions.

Another apparatus is described. The apparatus may include means for receiving RRC signaling that indicates (e.g., schedules, configures) resources for a set of multiple uplink shared channel transmission occasions, each of the set of multiple uplink shared channel transmission occasions configured with a capacity for transmission of a maximum quantity of TBs, the maximum quantity including two or more TBs, means for generating an uplink shared channel message in accordance with the RRC signaling, where the uplink shared channel message includes one or more TBs, the one or more TBs being less than the maximum quantity of TBs, and means for transmitting the uplink shared channel message within an uplink shared channel transmission occasion of the set of multiple uplink shared channel transmission occasions.

A non-transitory computer-readable medium storing code is described. The code may include instructions executable by a processor to receive RRC signaling that indicates (e.g., schedules, configures) resources for a set of multiple uplink shared channel transmission occasions, each of the set of multiple uplink shared channel transmission occasions configured with a capacity for transmission of a maximum quantity of TBs, the maximum quantity including two or more TBs, generate an uplink shared channel message in accordance with the RRC signaling, where the uplink shared channel message includes one or more TBs, the one or more TBs being less than the maximum quantity of TBs, and transmit the uplink shared channel message within an uplink shared channel transmission occasion of the set of multiple uplink shared channel transmission occasions.

Some examples of the method, apparatuses, and non-transitory computer-readable medium described herein may further include operations, features, means, or instructions for receiving, via the RRC signaling, additional control signaling, or both, an indication of a first modulation and coding scheme (MCS) associated with a first TB, and a second MCS associated with a second TB, where the uplink shared channel message includes the first TB in the one or more TBs and omits the second TB from the one or more TBs based on a comparison of the first MCS and the second MCS.

In some examples of the method, apparatuses, and non-transitory computer-readable medium described herein, the uplink shared channel message includes the first TB and omits the second TB based on the first MCS being greater than the second MCS.

In some examples of the method, apparatuses, and non-transitory computer-readable medium described herein, the uplink shared channel message includes the first TB and omits the second TB based on the first MCS being the same as the second MCS and on a comparison of transmission layers associated with the first TB and the second TB.

In some examples of the method, apparatuses, and non-transitory computer-readable medium described herein, the uplink shared channel message includes a first TB in the one or more TBs and omits a second TB from the one or more TBs based on the first TB being associated with a first set of transmission layers and the second TB being associated with a second set of transmission layers.

In some examples of the method, apparatuses, and non-transitory computer-readable medium described herein, the uplink shared channel message includes the first TB and omits the second TB based on the first set of transmission layers being lower than the second set of transmission layers.

In some examples of the method, apparatuses, and non-transitory computer-readable medium described herein, the first set of transmission layers includes transmission layers one through four and the second set of transmission layers includes transmission layers five through eight.

Some examples of the method, apparatuses, and non-transitory computer-readable medium described herein may further include operations, features, means, or instructions for transmitting an uplink control information (UCI) message via the first TB of the uplink shared channel message, where the UCI message includes a bit field value that indicates whether a second TB may be included within the one or more TBs of the uplink shared channel message.

In some examples of the method, apparatuses, and non-transitory computer-readable medium described herein, the UCI message includes first information that may be common across the first TB and the second TB, second information that may be unique to the first TB, and third information that may be unique to the second TB.

In some examples of the method, apparatuses, and non-transitory computer-readable medium described herein, the first information includes a hybrid automatic repeat request (HARQ) process identifier, channel occupancy time (COT) sharing information, or both, the second information includes a first redundancy version (RV) associated with the first TB, a first new data indicator (NDI) associated with the first TB, or both, and the third information includes a second RV associated with the second TB, a second NDI associated with the second TB, or both.

Some examples of the method, apparatuses, and non-transitory computer-readable medium described herein may further include operations, features, means, or instructions for transmitting a first UCI message via the first TB of the uplink shared channel message, where the first UCI message includes first information that may be common across the first TB and a second TB, and second information that may be unique to the first TB.

In some examples of the method, apparatuses, and non-transitory computer-readable medium described herein, the first UCI message further includes a bit field value indicating that the second TB may be included within the one or more TBs of the uplink shared channel message.

Some examples of the method, apparatuses, and non-transitory computer-readable medium described herein may further include operations, features, means, or instructions for transmitting a second UCI message via the second TB of the uplink shared channel message, where the second UCI message includes third information that may be unique to the second TB.

In some examples of the method, apparatuses, and non-transitory computer-readable medium described herein, the second UCI message further includes the first information that may be common across the first TB and the second TB.

Some examples of the method, apparatuses, and non-transitory computer-readable medium described herein may further include operations, features, means, or instructions for transmitting a second uplink shared channel message within a second uplink shared channel transmission occasion of the set of multiple uplink shared channel transmission occasions, where the second uplink shared channel message includes the maximum quantity of TBs.

In some examples of the method, apparatuses, and non-transitory computer-readable medium described herein, generating the uplink shared channel message may include operations, features, means, or instructions for generating the uplink shared channel message to include less than the maximum quantity of TBs based on a quantity of uplink traffic within a message buffer at the UE being less than a threshold quantity.

A method is described. The method may include transmitting RRC signaling that indicates resources for a set of multiple uplink shared channel transmission occasions, each of the set of multiple uplink shared channel transmission occasions configured with a capacity for transmission of a maximum quantity of TBs, the maximum quantity including two or more TBs and receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

An apparatus is described. The apparatus may include a processor, memory coupled with the processor, and instructions stored in the memory. The instructions may be executable by the processor to cause the apparatus to transmit RRC signaling that indicates resources for a set of multiple uplink shared channel transmission occasions, each of the set of multiple uplink shared channel transmission occasions configured with a capacity for transmission of a maximum quantity of TBs, the maximum quantity including two or more TBs and receive, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

Another apparatus is described. The apparatus may include means for transmitting RRC signaling that indicates resources for a set of multiple uplink shared channel transmission occasions, each of the set of multiple uplink shared channel transmission occasions configured with a capacity for transmission of a maximum quantity of TBs, the maximum quantity including two or more TBs and means for receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

A non-transitory computer-readable medium storing code is described. The code may include instructions executable by a processor to transmit RRC signaling that indicates resources for a set of multiple uplink shared channel transmission occasions, each of the set of multiple uplink shared channel transmission occasions configured with a capacity for transmission of a maximum quantity of TBs, the maximum quantity including two or more TBs and receive, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

Some examples of the method, apparatuses, and non-transitory computer-readable medium described herein may further include operations, features, means, or instructions for transmitting, via the RRC signaling, additional control signaling, or both, an indication of a first MCS associated with a first TB, and a second MCS associated with a second TB, where the uplink shared channel message includes the first TB in the one or more TBs and omits the second TB from the one or more TBs based on a comparison of the first MCS and the second MCS.

In some examples of the method, apparatuses, and non-transitory computer-readable medium described herein, the uplink shared channel message includes the first TB and omits the second TB based on the first MCS being greater than the second MCS.

In some examples of the method, apparatuses, and non-transitory computer-readable medium described herein, the uplink shared channel message includes the first TB and omits the second TB based on the first MCS being the same as the second MCS and on a comparison of transmission layers associated with the first TB and the second TB.

In some examples of the method, apparatuses, and non-transitory computer-readable medium described herein, the uplink shared channel message includes a first TB in the one or more TBs and omits a second TB from the one or more TBs based on the first TB being associated with a first set of transmission layers and the second TB being associated with a second set of transmission layers.

In some examples of the method, apparatuses, and non-transitory computer-readable medium described herein, the uplink shared channel message includes the first TB and omits the second TB based on the first set of transmission layers being lower than the second set of transmission layers.

In some examples of the method, apparatuses, and non-transitory computer-readable medium described herein, the first set of transmission layers includes transmission layers one through four and the second set of transmission layers includes transmission layers five through eight.

In some examples of the method, apparatuses, and non-transitory computer-readable medium described herein, the one or more TBs included within the uplink shared channel message includes at least a first TB and the method, apparatuses, and non-transitory computer-readable medium may include further operations, features, means, or instructions for receiving a UCI message via the first TB of the uplink shared channel message, where the UCI message includes a bit field value that indicates whether a second TB may be included within the one or more TBs of the uplink shared channel message.

In some examples of the method, apparatuses, and non-transitory computer-readable medium described herein, the UCI message includes first information that may be common across the first TB and the second TB, second information that may be unique to the first TB, and third information that may be unique to the second TB.

In some examples of the method, apparatuses, and non-transitory computer-readable medium described herein, the first information includes a HARQ process identifier, COT sharing information, or both, the second information includes a first RV associated with the first TB, a first NDI associated with the first TB, or both, and the third information includes a second RV associated with the second TB, a second NDI associated with the second TB, or both.

In some examples of the method, apparatuses, and non-transitory computer-readable medium described herein, the one or more TBs included within the uplink shared channel message includes a first TB and the method, apparatuses, and non-transitory computer-readable medium may include further operations, features, means, or instructions for receiving a first UCI message via the first TB of the uplink shared channel message, where the first UCI message includes first information that may be common across the first TB and a second TB, and second information that may be unique to the first TB.

In some examples of the method, apparatuses, and non-transitory computer-readable medium described herein, the first UCI message further includes a bit field value indicating that the second TB may be included within the one or more TBs of the uplink shared channel message.

In some examples of the method, apparatuses, and non-transitory computer-readable medium described herein, the one or more TBs included within the uplink shared channel message includes the second TB and the method, apparatuses, and non-transitory computer-readable medium may include further operations, features, means, or instructions for receiving a second UCI message via the second TB of the uplink shared channel message, where the second UCI message includes third information that may be unique to the second TB.

In some examples of the method, apparatuses, and non-transitory computer-readable medium described herein, the second UCI message further includes the first information that may be common across the first TB and the second TB.

Some examples of the method, apparatuses, and non-transitory computer-readable medium described herein may further include operations, features, means, or instructions for receiving a second uplink shared channel message within a second uplink shared channel transmission occasion of the set of multiple uplink shared channel transmission occasions, where the second uplink shared channel message includes the maximum quantity of TBs.

DETAILED DESCRIPTION

Figure 1:
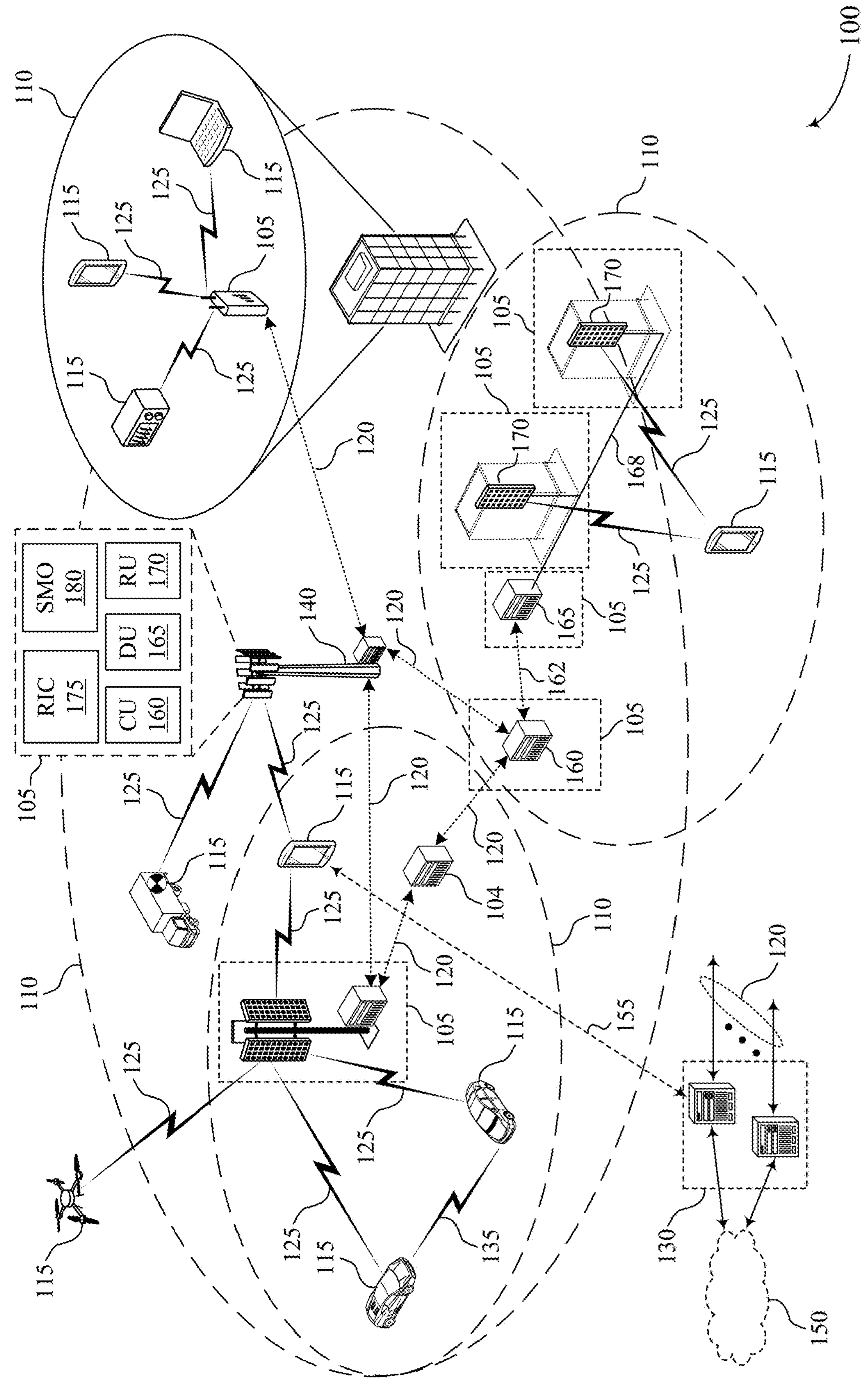
FIG. 1 illustrates an example of a wireless communications system that supports techniques for skipping physical uplink shared channel (PUSCH) occasions with multiple codewords (CWs) in accordance with one or more aspects of the present disclosure.

In some wireless networks, a user equipment (UE) may receive a configured grant physical uplink shared channel (CG-PUSCH) that includes a set of multiple physical uplink shared channel (PUSCH) transmission occasions usable by the UE for transmitting PUSCH messages. In some cases, the PUSCH transmission occasions may be associated with multiple transport blocks (TBs) or codewords (CWs). For example, the UE may be able to transmit PUSCH messages that include a first TB (TB1) and a second TB (TB2) within each PUSCH transmission occasion. In some cases, a message buffer at the UE may not include uplink data to be transmitted, or may include only a small amount of data to be transmitted. In such cases, the UE may not need to use two TBs for each PUSCH occasion to transmit all the buffered data. However, some networks use binary rules or configurations in which each PUSCH occasion is completely used (e.g., TB1 and TB2 are both transmitted in each PUSCH occasion), or where each PUSCH occasion is completely skipped (e.g., TB1 and TB2 are both skipped). Such binary rules offer little flexibility, and may result in wasted resources and/or increased latency.

Accordingly, aspects of the present disclosure are directed to configurations and mechanisms that enable UEs to drop subsets of TBs from PUSCH messages communicated in PUSCH occasions configured for multiple TBs. In other words, aspects of the present disclosure are directed to rules and signaling that enable UEs to transmit PUSCH messages that include only a subset of TBs of a set of TBs enabled for a respective PUSCH occasion.

For example, a UE may receive a CG-PUSCH configuration that includes (e.g., indicates, configures, schedules) a set of multiple PUSCH occasions usable by the UE for transmitting PUSCH messages. In this example, each PUSCH occasion may be associated with (e.g., configured with, scheduled with) multiple TBs, such as TB1 and TB2. In this example, if the UE has only a small amount of data to be transmitted, the UE may transmit a PUSCH message within a PUSCH occasion, where the PUSCH message includes only TB1 (and omits/drops TB2). In other words, the UE may transmit PUSCH messages that include fewer TBs than a maximum quantity of TBs enabled for the respective PUSCH transmission occasions.

In some aspects, the network may define rules or conditions which indicate which TB is to be dropped/omitted in cases where the UE is to transmit a PUSCH message including only a subset of the configured TBs for a given PUSCH transmission occasion. Such rules/conditions may be used by the network to determine which TB to decode first. In other words, the network may be configured to decode "TB1" for a respective PUSCH message, but the rules/configurations may define which TB is regarded as "TB1." In some cases, uplink control information (UCI) messages multiplexed with transmitted PUSCH messages may include a bit field that indicates whether or not TB2 is included within the PUSCH message. As such, the network may determine whether or not to monitor for (and decode) TB2 based on the indicated bit field.

Aspects of the disclosure are initially described in the context of wireless communications systems. Additional aspects of the disclosure are described in the context of example resource configurations and an example process flow. Aspects of the disclosure are further illustrated by and described with reference to apparatus diagrams, system diagrams, and flowcharts that relate to techniques for skipping PUSCH occasions with multiple CWs.

FIG. 1 illustrates an example of a wireless communications system 100 that supports techniques for skipping PUSCH occasions with multiple CWs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more Dus 165 or RUs 170, and the one or more Dus 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more Dus 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more Dus 165 or one or more RUs 170 may be partially controlled by one or more Cus 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by Dus 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include Dus 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other Cus 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., Dus 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the Dus 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for skipping PUSCH occasions with multiple CWs as described herein. For example, some operations described as being performed by a UE 115 or a network entity 105 (e.g., a base station 140) may additionally, or alternatively, be performed by one or more components of the disaggregated RAN architecture (e.g., IAB nodes 104, Dus 165, Cus 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same CW) or different data streams (e.g., different CWs). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UEs 115 and the network entities 105 of the wireless communications system 100 may support configurations and mechanisms that enable UEs 115 to drop subsets of TBs from PUSCH messages communicated in PUSCH occasions configured for multiple TBs. In other words, the wireless communications system 100 may support rules and signaling that enable UEs 115 to transmit PUSCH messages that include only a subset of TBs of a set of TBs enabled for a respective PUSCH occasion.

For example, a UE 115 of the wireless communications system 100 may receive a CG-PUSCH configuration from the network that includes (e.g., indicates, configures, schedules) a set of multiple PUSCH occasions usable by the UE 115 for transmitting PUSCH messages. In this example, each PUSCH occasion may be associated with (e.g., configured with, scheduled with) multiple TBs, such as TB1 and TB2. In this example, if the UE 115 has only a small amount of data to be transmitted, the UE 115 may transmit a PUSCH message within a PUSCH occasion, where the PUSCH message includes only TB1 (and omits/drops TB2). In other words, the UE 115 may transmit PUSCH messages that include fewer TBs than a maximum quantity of TBs enabled for the respective PUSCH transmission occasions.

In some aspects, the network may define rules or conditions which indicate which TB is to be dropped/omitted in cases where the UE 115 is to transmit a PUSCH message including only a subset of the configured TBs for a given PUSCH transmission occasion. Such rules/conditions may be used by the network to determine which TB to decode first. In other words, the network may be configured to decode "TB1" for a respective PUSCH message, but the rules/configurations may define which TB is regarded as "TB1." In some cases, UCI messages multiplexed with transmitted PUSCH messages may include a bit field that indicates whether or not TB2 is included within the PUSCH message. As such, the network may determine whether or not to monitor for (and decode) TB2 based on the indicated bit field.

Techniques described herein may enable UEs 115 to transmit PUSCH messages with fewer TBs/CWs as compared to a maximum quantity of TBs configured for a respective PUSCH transmission occasion. In other words, aspects of the present disclosure may enable UEs 115 to be configured with PUSCH transmission occasions enabled for multiple TBs, but to selectively "drop" or omit one or more TBs from PUSCH messages communicated in the respective PUSCH transmission occasions, such as based on an amount of data to be communicated within a message buffer at the UE 115. In this regard, as compared to some "binary" rules implemented by some networks in which all configured TBs are either transmitted or dropped in a respective PUSCH occasion, aspects of the present disclosure may enable improved flexibility in the context of CG-PUSCH configurations associated with multiple TBs. Moreover, by enabling UEs 115 to selectively drop TBs from PUSCH messages, techniques described herein may reduce wasted resources and improve resource utilization within the wireless communications system. Further, by enabling UEs 115 to selectively drop TBs from PUSCH messages, aspects of the present disclosure may reduce or eliminate scenarios where the UE 115 is expected to completely drop a PUSCH message, thereby reducing latency within the network.

Figure 2:
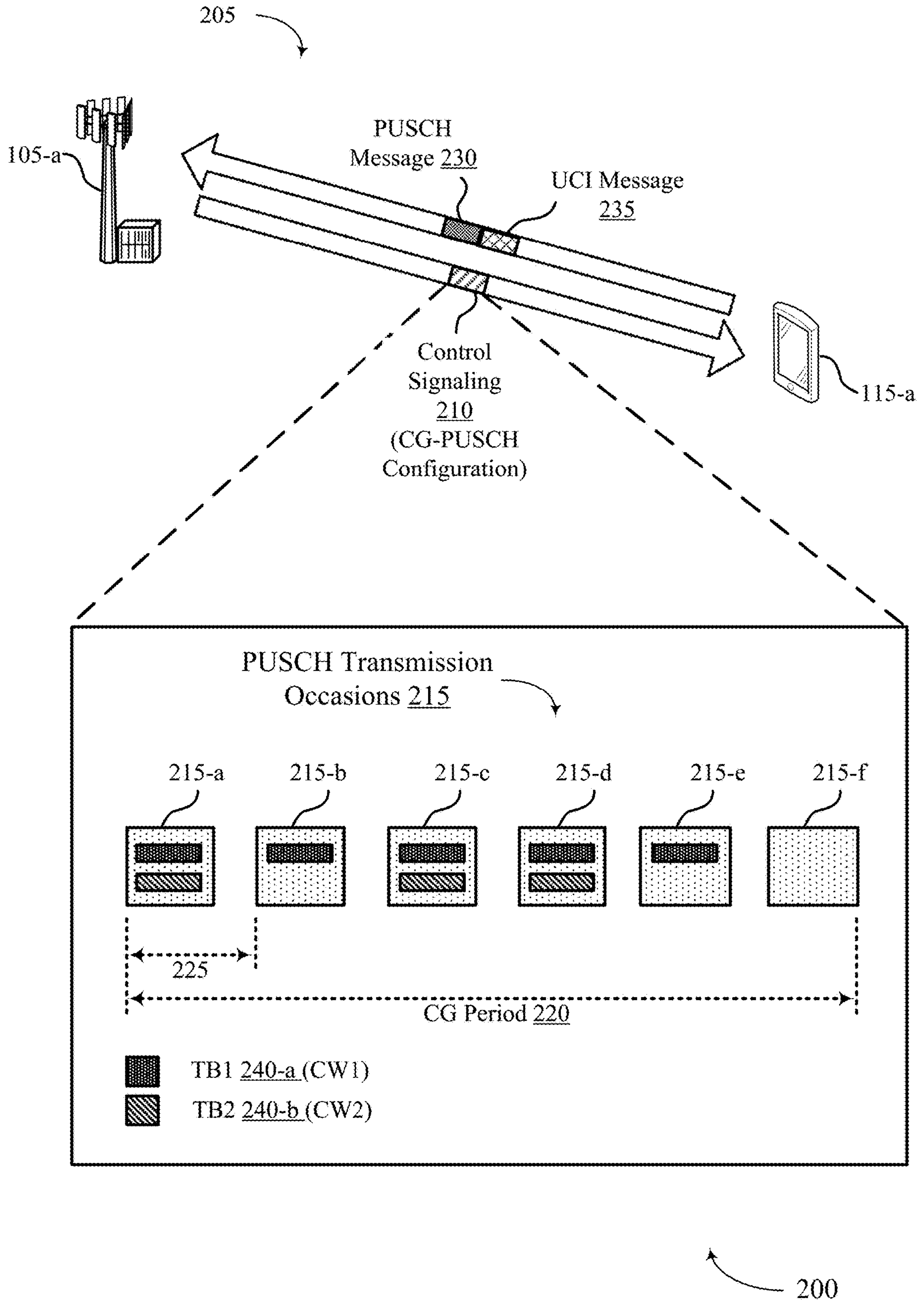
FIG. 2 illustrates an example of a wireless communications system that supports techniques for skipping PUSCH occasions with multiple CWs in accordance with one or more aspects of the present disclosure.

FIG. 2 illustrates an example of a wireless communications system 200 that supports techniques for skipping PUSCH occasions with multiple CWs in accordance with one or more aspects of the present disclosure. Aspects of the wireless communications system 200 may implement, or be implemented by, aspects of the wireless communications system 100. For example, the wireless communications system 200 illustrates signaling and configurations that enable a UE 115-*a* to transmit PUSCH messages using less than a maximum quantity of TBs configured for a respective PUSCH transmission occasion, as described previously herein.

The wireless communications system 200 may include a UE 115-*a* and a network entity 105-*b*, which may be examples of UEs 115, network entities 105, and other wireless devices as described with reference to FIG. 1. In some aspects, the UE 115-*a* may communicate with the network entity 105-*a* via a communication link 205. In some cases, the communication link 205 may include an example of an access link (e.g., Uu link). The communication link 205 may include a bi-directional link that can include both uplink and downlink communication. For example, the UE 115-*a* may transmit uplink transmissions, such as uplink control signals or uplink data signals, to the network entity 105-*a* using the communication link 205, and the network entity 105-*a* may transmit downlink transmissions, such as downlink control signals or downlink data signals, to the UE 115-*a* using the communication link 205.

As noted previously herein, in some wireless networks, wireless devices (e.g., UEs 115) may receive signaling indicating a CG-PUSCH configuration that includes a set of multiple PUSCH transmission occasions 215 usable by the respective UEs 115 for transmitting PUSCH messages 230. In other words, a UE 115 may receive a CG-PUSCH configuration including preconfigured uplink transmission opportunities within a CG period 220 that are usable by the UE 115. In such cases, the UE 115 may transmit PUSCH messages 230 within the allocated resources (e.g., within the PUSCH transmission occasions 215) if the UE 115 has uplink data in a message buffer. Such CG-PUSCH configurations may be usable in cases where the uplink data at the UE 115 has a variable instantaneous data generation rate.

Some wireless communications systems may support different types of CG-PUSCH configurations, such as CG-PUSCH Type 1 and CG-PUSCH Type 2. In the context of CG-PUSCH Type 1, all the information of the CG-PUSCH is configured and activated via RRC signaling. That is, the UE 115-*a* may receive a Type 1 CG-PUSCH configuration via RRC signaling, where the RRC signaling also activates the CG-PUSCH configuration.

Comparatively, with CG-PUSCH Type 2, the CG-PUSCH configuration may be configured via RRC signaling, but activated via DCI or MAC-CE signaling. In other words, some information of a Type 2 CG-PUSCH configuration may be RRC configured (e.g., periodicity 225 of PUSCH transmission occasions 215, offsets, etc.), where other information may be indicated via a DCI message that activates the CG-PUSCH configuration. With CG-PUSCH Type 2, DCI messages may activate the CG-PUSCH configuration until another DCI message deactivates or releases the CG-PUSCH configuration. In some aspects, for DCI messages that activate or deactivate (e.g., release) CG-PUSCH configurations, a cyclic redundancy check (CRC) portion of the DCI messages may be scrambled with configured scheduling radio network temporary identifier (CS-RNTI). Moreover, bit field values (e.g., new data indicator (NDI) bit fields, redundancy version (RV) bit fields, HARQ bit fields) may be set to certain predefined values for activation/deactivation DCI messages (e.g., DCI messages may include bit field values NDI=0, RV=0, and HARQ ID=0 used for validation of the activation/release of the CG-PUSCH configuration).

In some networks, for both Type 1 and Type 2 CG-PUSCH configurations, the RV for each PUSCH transmission occasion 215 may be set to zero (e.g., RV=0), and the HARQ ID may be computed (for each PUSCH transmission occasion 215) based on a timing with a modulo operation to nrofHARQ-Processes associated with the CG-PUSCH configuration. In other words, in some networks, the HARQ process ID for each respective PUSCH transmission occasion 215 may be determined based on a first symbol of the respective PUSCH transmission occasion 215. For example, in some networks, and using the modulo operation to nrofHARQ-Processes, the first PUSCH transmission occasion 215-*a* may be associated with HARQ ID: 0, the second PUSCH transmission occasion 215-*b* may be associated with HARQ ID: 1, the third PUSCH transmission occasion 215-*c* may be associated with HARQ ID: 2, the fourth PUSCH transmission occasion 215-*d* may be associated with HARQ ID: 3, the fifth PUSCH transmission occasion 215-*e* may be associated with HARQ ID: 0, and the sixth PUSCH transmission occasion 215-*f* may be associated with HARQ ID: 1.

In other wireless networks, PUSCH transmission occasions 215 may be used for retransmissions, and parameters of the respective PUSCH transmission occasions 215 may be dynamically set or indicated. Stated differently, the UE 115-*a* may autonomously determine/signal parameters for each respective PUSCH transmission occasion 215, such as the HARQ ID, the NDI, and RV. Such parameters may be indicated via UCI messages 235 associated with (e.g., communicated within) the respective PUSCH transmission occasions 215. The NDI may be toggled for a respective PUSCH transmission occasion 215 to indicate that the PUSCH transmission occasion 215 is used for a new transmission, otherwise, it is used for a retransmission (or vice versa).

In such networks where parameters of the respective PUSCH transmission occasions 215 are dynamically indicates, the network entity 105-*a* may determine the parameters used for decoding PUSCH messages 230 based on the UCI messages 235 communicated within the respective PUSCH transmission occasions 215. In particular, UCI messages 235 (e.g., CG-UCI) may is multiplexed with PUSCH messages 230 within each respective PUSCH transmission occasion 215, where the UCI messages 235 include bit fields indicating HARQ ID, RV, NDI, and channel occupancy time (COT) sharing information (for unlicensed operations) of the respective PUSCH transmission occasions 215. In other words, the CG-UCI (e.g., UCI message 235) may be encoded separately and multiplexed on the CG-PUSCH message 230 that the information corresponds to (e.g., UCI message 235 multiplexed with a PUSCH message 230 of the first PUSCH transmission occasion 215-*a* indicates information associated with the PUSCH message 230/first PUSCH transmission occasion 215-*a*). As such, upon receiving the PUSCH message 230 including the multiplexed UCI message 235, the network entity 105-*a* may decode the CG-UCI (UCI message 235), and use the information of the CG-UCI to decode the uplink data of the PUSCH message 230.

Table 1 below illustrates information that may be communicated within UCI messages 235 associated with CG-PUSCH configurations:

TABLE 1

| UCI Information for CG-PUSCH Occasions | |
|---|---|
| Bit Field(s) Information | Bitwidth |
| HARQ Process ID/Number | 4 |
| Redundancy Version (RV) | 2 |
| New Data Indicator (NDI) | 1 |
| Channel Occupancy Time (COT) Sharing Information | $\lceil \log_2 C \rceil$ if both higher layer parameters ul-toDL-COT-SharingED-Threshold and cg-COT-SharingList are configured, where C is the number of combinations configured in cg-COT-SharingList;<br>1 if ul-toDL-COT-SharingED-Threshold is not configured and cg-COT-SharingList is configured;<br>0 otherwise;<br>If a UE indicates COT sharing other than "no sharing" in a CG-PUSCH occasion within the UE's initiated COT, the UE should provide consistent sharing information in all subsequent CG-PUSCH occasions, if any, occurring within the same initiated COT such that the same DL starting point and duration are maintained. |

As noted previously herein, in some wireless networks, PUSCH transmission occasions 215 of a CG-PUSCH configuration may support a single TB 240 or CW. That is, for each PUSCH transmission occasion 215, the UE 115-*a* may transmit a PUSCH messages 230 including a single TB 240.

Comparatively, in other wireless networks, PUSCH transmission occasions 215 may be associated with multiple TBs 240 or CWs. For example, in some cases, the PUSCH transmission occasions 215 illustrated in FIG. 2 may be enabled with (e.g., support) two TBs, such as a first TB 240-*a* (TB1) and a second TB 240-*b* (TB2). In such cases, the UE 115-*a* may PUSCH messages 230 in each PUSCH transmission occasion 215 that include the first TB 240-*a* (TB1) and the second TB 240-*b* (TB2).

In some cases, a message buffer at the UE 115-*a* may not include uplink data to be transmitted, or may include only a small amount of data to be transmitted. In such cases, the UE 115-*a* may not need to use two TBs 240 for each PUSCH transmission occasion 215 to transmit all the buffered data. However, some networks use binary rules or configurations in which each PUSCH transmission occasion 215 is completely used (e.g., first TB 240-*a* and second TB 240-*b* are both transmitted in each PUSCH transmission occasion 215), or where each PUSCH transmission occasion 215 is completely skipped (e.g., first TB 240-*a* and second TB 240-*b* are both skipped). Such binary rules offer little flexibility, and may result in wasted resources. Moreover, in cases where the UE 115-*a* has data to transmit via the first TB 240-*a*, but does not have sufficient data to transmit the second TB 240-*b*, the UE 115 may nonetheless be expected to skip transmitting both TBs 240, thereby resulting in increased latency associated with the data that could have otherwise be communicated via the first TB 240-*a*.

Accordingly, the UE 115-*a* and the network entity 105-*a* of the wireless communications system 200 may support configurations and mechanisms that enable the UE 115-*a* to drop subsets of TBs 240 from PUSCH messages 230 communicated in PUSCH transmission occasions 215 configured for multiple TBs 240. In other words, aspects of the present disclosure are directed to rules and signaling that enable the UE 115-*a* to transmit PUSCH messages 230 that include only a subset of TBs 240 (e.g., subset of CWs) of a set of TBs 240 enabled for a respective PUSCH transmission occasion 215.

For the purposes of the present disclosure, a "TB" may indicate or include data to be transmitted prior to encoding, whereas the term "CW" may refer to the data to be transmitted after encoding. As such, for the purposes of the present disclosure, the terms "TB" may "CW" may be used interchangeably.

For example, referring to the wireless communications system 200 in FIG. 2, the UE 115-*a* may receive, from the network entity 105-*a*, control signaling 210 (e.g., control information) that indicates or schedules a set of uplink shared channel transmission occasions usable by the UE 115-*a*. In other words, the UE 115-*a* may receive control signaling 210 (e.g., RRC signaling, downlink control information (DCI) signaling, MAC-CE) that indicates a CG-PUSCH configuration (e.g., Type 1 or Type 2) that includes multiple PUSCH transmission occasions 215 within a CG period 320 that are usable by the UE 115-*a* for transmitting PUSCH messages 230. In some aspects, the control signaling 210 may indicate other parameters of the CG-PUSCH configuration, such as a periodicity 225 of the set of PUSCH transmission occasions 215.

In some aspects, each of the PUSCH transmission occasions 215 may be enabled with a capacity or communicating a maximum quantity of TBs 240. For example, the control signaling 210 may indicate that the PUSCH transmission occasions 215 may be used to communicate up to two, three, four, etc. TBs 240 per PUSCH transmission occasion 215 (e.g., maximum quantity of TBs=2, 3, 4, . . . , etc.).

For instance, as shown in FIG. 2, the control signaling 210 may indicate that the PUSCH transmission occasions 215 are enabled for transmission of two TBs 240 each (e.g., first TB 240-*a* and second TB 240-*b*). While much of the present disclosure is described in the context of PUSCH transmission occasions 215 that are enabled for a maximum of two TBs 240 per PUSCH transmission occasion 215 (e.g., TB1 and TB2), this is solely for illustrative purposes. In this regard, aspects of the present disclosure may be applied to PUSCH transmission occasions 215 enabled with any number of TBs 240.

In some aspects, the UE 115-*a* may be configured to utilize the configured PUSCH transmission occasions 215 to transmit PUSCH messages 230 that include up to the maximum quantity of TBs 240. For example, in cases where an uplink buffer at the UE 115-*a* includes sufficient data for two TBs 240, the UE 115-*a* may utilize the first PUSCH transmission occasion 215-*a* to transmit a first PUSCH message 230 that includes the first TB 240-*a* and the second TB 240-*b*. Subsequently, the uplink buffer at the UE 115-*a* may include a smaller amount of uplink data to be transmitted. As such, the UE 115-*a* may utilize the second PUSCH transmission occasion 215-*b* to transmit a second PUSCH message 230 that includes the first TB 240-*a*, but which omits the second TB 240-*b*. In other words, the UE 115-*b* may transmit the second PUSCH message 230 in the second PUSCH transmission occasion 215 with fewer than the maximum quantity of enabled TBs 240.

In this regard, the UE 115-*b* may transmit PUSCH messages 230 within the PUSCH transmission occasions 215 that include the maximum quantity of enabled TBs 240 (e.g., PUSCH transmission occasions 215-*a*, 215-*c*, 215-*d*), and/or less than the maximum quantity of enabled TBs 240 (e.g., PUSCH transmission occasions 215-*b*, 215-*e*) based on when data arrives at the message buffer/how much data is in the message buffer. That is, the UE 115-*b* may omit (e.g., skip) one or more TBs 240 from PUSCH messages 230 transmitted via the PUSCH transmission occasions 215-*b* and 215-*e*. Moreover, in some cases, the UE 115-*b* may completely skip a PUSCH transmission occasion 215. For example, as shown in FIG. 2, the UE 115-*b* may refrain from transmitting any PUSCH messages 230 in the PUSCH transmission occasion 215-*f*, such as in cases where the UE 115-*a* does not have any uplink data to transmit in the message buffer. In this regard, the PUSCH transmission occasion 215-*f* may go unused.

In some aspects, to avoid the network entity 105-*a* having to blindly detect which TB 240 is skipped in cases where a PUSCH message 230 includes less than the maximum quantity of TBs 240, the UE 115-*a* may be configured (via the control signaling 210) to skip/omit the second TB 240-*b* and transmit the first TB 240-*a*. In such cases, the UE 115-*a* may be configured with rules or parameters that are used to determine which TB 240 is considered to be the "first TB 240-*a* (TB1)" For example, in some cases, the first TB 240-*a* (TB1) may be defined as the TB 240 which is mapped to MIMO layers 1-4, where the second TB 240-*b* (TB 2) may be defined as the TB 240 that is mapped to MIMO layer 5-8 (or vice versa). In this regard, in cases where the UE 115-*a* transmits a PUSCH message 230 including less than the maximum quantity of TBs 240, the UE 115-*b* may be configured to include/transmit the first TB 240-*a* mapped to the lower MIMO layers (e.g., MIMO layers 1-4), and may be configured to omit or skip the second TB 240-*b* mapped to the higher MIMO layers (e.g., MIMO layers 5-8).

The generation of PUSCH messages 230 using multiple TBs 240 mapped to different MIMO layers may be further shown and described with reference to FIG. 3.

Figure 3:
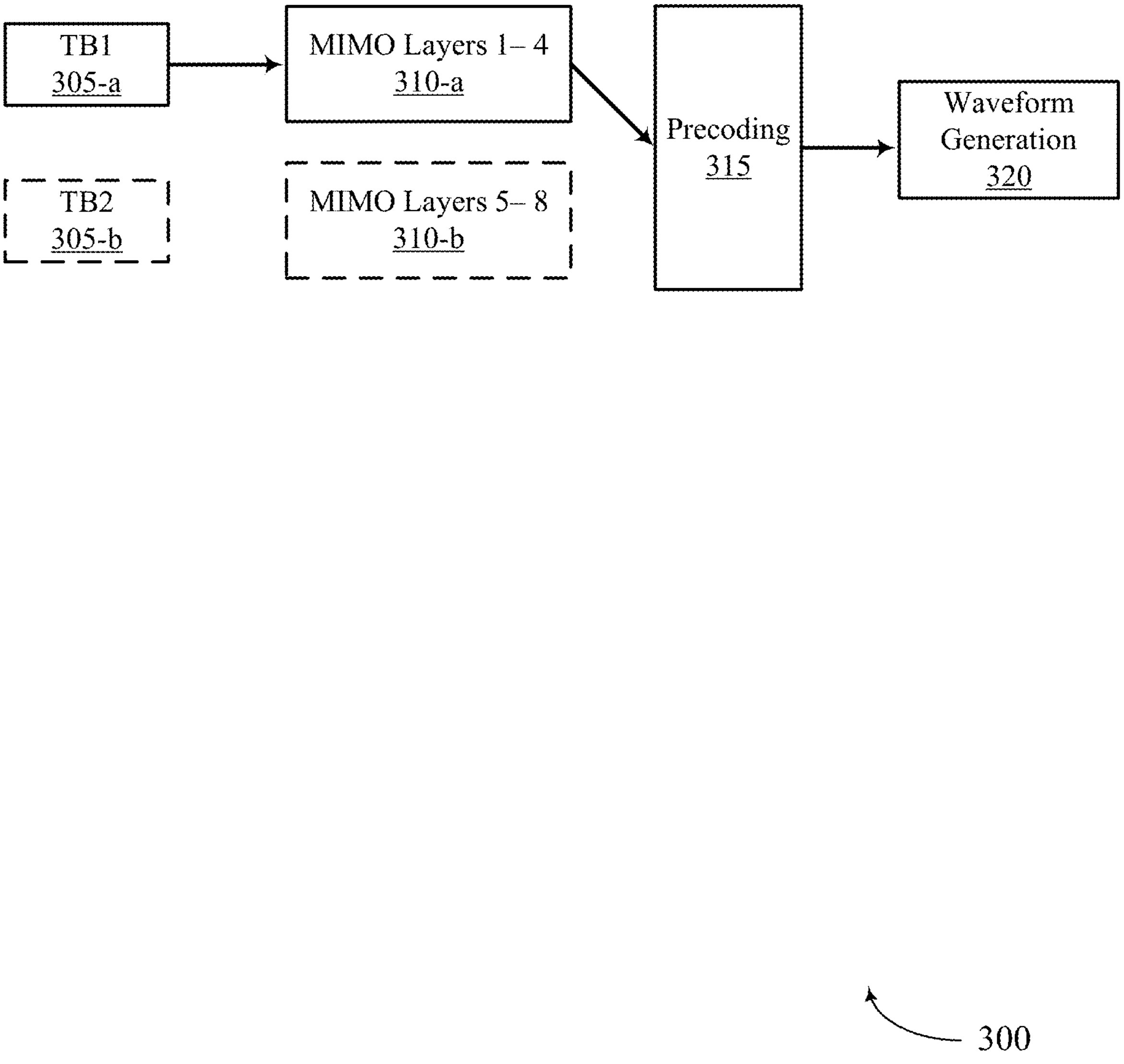
FIG. 3 illustrates an example of a CG-PUSCH transmit chain that supports techniques for skipping PUSCH occasions with multiple CWs in accordance with one or more aspects of the present disclosure.

FIG. 3 illustrates an example of a CG-PUSCH transmit chain 300 that supports techniques for skipping PUSCH occasions with multiple CWs in accordance with one or more aspects of the present disclosure. Aspects of the CG-PUSCH transmit chain 300 may implement, or be implemented by, aspects of wireless communications system 100, the wireless communications system 200, or both.

The CG-PUSCH transmit chain 300 illustrates an example in which a UE 115 generates a PUSCH message using less than a maximum quantity of TBs configured for a respective PUSCH transmission occasion. For example, as shown in FIG. 3, a UE 115 may receive a CG-PUSCH configuration including PUSCH transmission occasions that are enabled for transmitting up to two TBs, including a first TB 305-*a* and a second TB 305-*b*. In this example, the first TB 305-*a* may be mapped to a first set of MIMO layers 310-*a* (e.g., layers 1-4), and the second TB 305-*b* may be mapped to a second set of MIMO layers 310-*b* (e.g., layers 5-8).

In cases where the UE 115 is to transmit a PUSCH message including both TBs 305, each of the TBs 305 mapped to the respective sets of MIMO layers 310 may be precoded for the PUSCH message at 315 (thereby generating CWs after encoding), and may go through waveform generation at 320 to generate a waveform/PUSCH message that includes both TBs 305.

Comparatively, as shown in FIG. 3, in cases where the UE 115 is to transmit a PUSCH message that includes less than the maximum quantity of TBs 305, the UE 115 may be configured to include/transmit the first TB 305-*a*, and omit or skip the second TB 305-*b*. For instance, as shown in FIG. 3, the UE 115 may perform precoding of the first TB 305-*a* at 315, and may perform waveform generation at 320 to generate a waveform/PUSCH message that includes only the first TB 305-*a*.

Reference will again be made to FIG. 2. In additional or alternative implementations, which TB 240 is regarded as "TB1" (and therefore which TBs 240 are transmitted or skipped in cases where the UE 115-*a* transmits less than the maximum quantity of TBs 240) may be based on modulation and coding schemes (MCSs) associated with the respective TBs 240. For example, in some cases, the first TB 240-*a* (TB1) may be defined as the TB 240 with the higher MCS, where the second TB 240-*b* (TB2) may be defined as the TB 240 with the lower MCS (or vice versa). In such cases, the respective MCSs corresponding to the respective TBs 240 may be indicated or configured via the control signaling 210. In this regard, in cases where the UE 115-*a* transmits a PUSCH message 230 including less than the maximum quantity of TBs 240, the UE 115-*b* may be configured to include/transmit the first TB 240-*a* with the higher MCS, and may be configured to omit or skip the second TB 240-*b* with the lower MCS.

In cases where the first MCS of the first TB 240-*a* and the second MCS of the second TB 240-*b* are the same, the UE 115-*a* may be configured to fall back to some other parameter to determine which TB(s) 240 will be included and which TB(s) 240 will be omitted from a PUSCH message 230. For example, in cases where the MCSs of the TBs 240 are the same, the first TB 240-*a* (TB1) may be defined as the TB 240 that is mapped to MIMO transmission layers 1-4.

In some aspects, the PUSCH messages 230 transmitted by the UE 115-*a* may include one or more bit fields that indicate whether subsequent TBs 240 are included in the respective PUSCH messages 230 or not. Such bit fields may be used to indicate whether the network entity 105-*a* is expected to decode all the TBs 240 enabled for a respective PUSCH transmission occasion 215, or less than all the TBs 240 enabled for a respective PUSCH transmission occasion 215. In other words, such bit field values may prevent the need for the network entity 105-*a* to perform blind detection to determine whether TBs 240 are skipped in the respective PUSCH messages 230 or not.

For example, the PUSCH messages 230 transmitted via the PUSCH transmission occasions 215-*a*, 215-*c*, and 215-*d* may include one or more bit field values that indicate that the second TB 240-*b* is included within the respective messages (so that the network entity 105-*b* knows to decode the second TB 240-*b*). Comparatively, the PUSCH messages 230 transmitted via the PUSCH transmission occasions 215-*b* and 215-*e* may include one or more bit field values that indicate that the second TB 240-*b* is omitted from the respective messages (so that the network entity 105-*b* knows not to decode the second TB 240-*b*).

In cases where the PUSCH transmission occasions 215 are enabled with more than two TBs 240 (e.g., three TBs 240, four TBs 240, etc.), the PUSCH messages 230 may include additional bit fields that indicate whether each of the respective TBs 240 is included or not (e.g., first set of bit field values indicating whether TB2 is included, second set of bit field values indicating whether TB3 is included, etc.). Indicators/bit fields used.

In some cases, the bit field values indicating whether subsequent TBs 240 are included in the respective PUSCH messages 230 may be included within UCI message 235 (e.g., CG-UCI) that are multiplexed with the respective PUSCH messages 230. In other words, the PUSCH messages 230 may include UCI messages 235, where information in the UCI messages 235 is decoded by the network entity 105-*a* to enable the network entity 105-*a* to decode the data of the respective PUSCH messages 230. In other words, upon receiving a PUSCH message 230, the network entity 105-*a* may be configured to decode the UCI messages 235 included within (e.g., multiplexed with) the PUSCH message 230, and may use the decoded UCI to decode the remainder of the PUSCH message 230.

In some cases, the control signaling 210 may indicate a format of PUSCH messages 230, including how UCI messages 235 are to be multiplexed with the PUSCH messages 230. Example resource configurations for PUSCH messages 230 including UCI messages 235 are shown and described in FIGS. 4-6.

Figure 4:
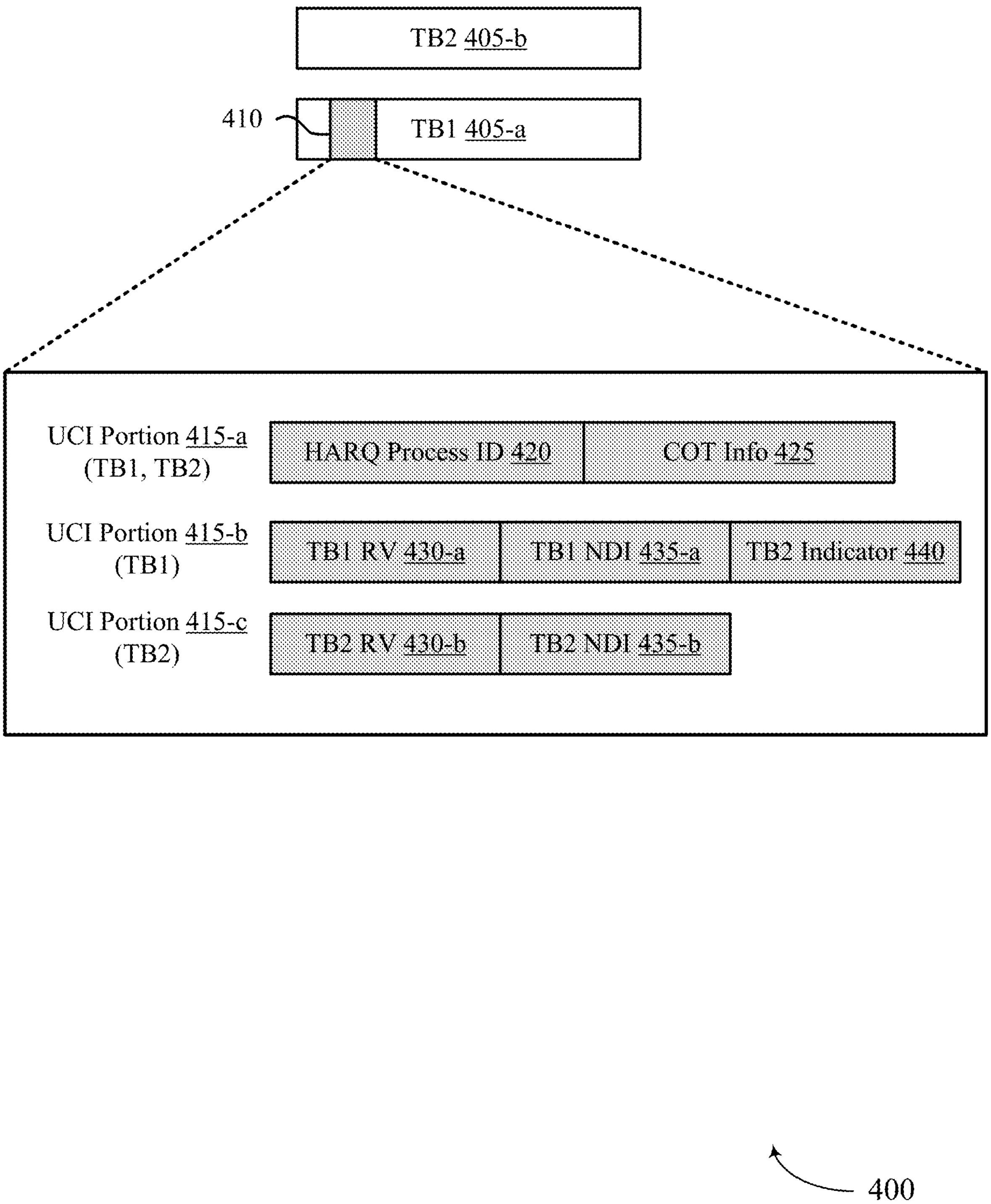
FIG. 4 illustrates an example of a resource configuration that supports techniques for skipping PUSCH occasions with multiple CWs in accordance with one or more aspects of the present disclosure.

FIG. 4 illustrates an example of a resource configuration 400 that supports techniques for skipping PUSCH occasions with multiple CWs in accordance with one or more aspects of the present disclosure. Aspects of the resource configuration 400 may implement, or be implemented by, aspects of the wireless communications system 100, the wireless communications system 200, the CG-PUSCH transmit chain 300, or any combination thereof.

As shown in FIG. 4, a PUSCH message may include a first TB 405-*a* and a second TB 405-*b*. In some implementations, the first TB 405-*a* may include a UCI message 410, where the second TB 405-*b* does not include any UCI. In other words, in accordance with the resource configuration 400, all the UCIs may be jointly encoded and multiplexed on the first TB 505-*a*. In this example, the UCI message 410 included in the first TB 405-*a* may include multiple different UCI portions 415. The respective UCI portions 415 may include information that is common across the TBs 405, or unique/specific to the respective TBs 405. For instance, the UCI message 410 may include a first UCI portion 415-*a* that includes information that is common across the first TB 405-*a* and the second TB 405-*b*, such as a HARQ process ID 420, COT information 425, or both. Comparatively, the second UCI portion 415-*b* and the third UCI portion 415-*c* may include information that is unique/specific to the first TB 405-*a* and the second TB 405-*b*, respectively. Information that is unique/specific to the respective TBs 405 may include RVs 430-*a*, 430-*b* of the respective TBs 405, NDIs 435-*a*, 435-*b* that indicate whether the respective TBs 405 include new data or whether the TBs 405 are retransmissions, and the like.

In some implementations, the second UCI portion 415-*b* may additionally include a TB2 indicator 440 that is used to indicate whether or not the second TB 405-*b* is included within the respective PUSCH message or not. In other words, the TB2 indicator 440 may be set to "1" in cases where the second TB 405-*b* is included in the PUSCH message, or set to "0" in cases where the second TB 405-*b* is not included in the PUSCH message (or vice versa). In cases where the second TB 405-*b* is not included in the PUSCH message, the bit fields of the third UCI portion 415-*c* (e.g., RV 430-*b*, NDI 435-*b*) may be set to predefined values, such as all "0s."

Figure 5:
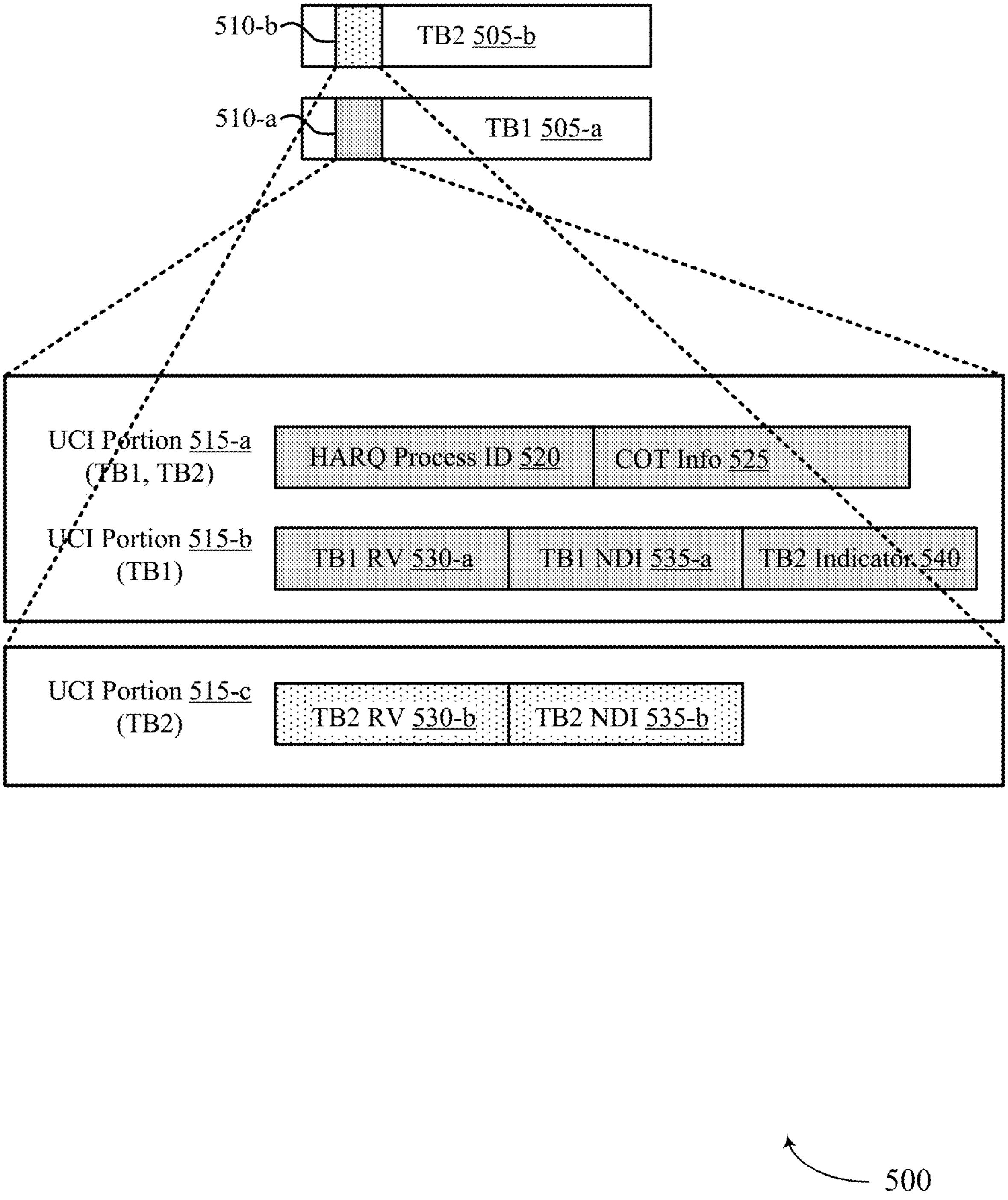
FIG. 5 illustrates an example of a resource configuration that supports techniques for skipping PUSCH occasions with multiple CWs in accordance with one or more aspects of the present disclosure.

FIG. 5 illustrates an example of a resource configuration 500 that supports techniques for skipping PUSCH occasions with multiple CWs in accordance with one or more aspects of the present disclosure. Aspects of the resource configuration 500 may implement, or be implemented by, aspects of the wireless communications system 100, the wireless communications system 200, the CG-PUSCH transmit chain 300, the resource configuration 400, or any combination thereof.

As shown in FIG. 5, a PUSCH message may include a first TB 505-*a* and a second TB 505-*b*. In some implementations, the first TB 505-*a* may include a first UCI message 510-*a*, and the second TB 505-*b* may include a second UCI message 510-*b*. In this example, the first UCI message 510-*a* may include a first UCI portion 515-*a* that includes information that is common across the TBs 505-*a*, 505-*b* (e.g., HARQ process ID 520, COT information 525), and a second UCI portion 515-*b* that includes information that is specific to the first TB 505-*a* (e.g., RV 530-*a*, NDI 535-*a*). In this regard, The common UCI and UCI that is specific to the first TB 505-*a* may be jointly encoded and multiplexed on the first TB 505-*a*. Comparatively, the second UCI message 510-*b* may include a third UCI portion 515-*c* that includes information that is specific to the second TB 505-*b* (e.g., RV 530-*b*, NDI 535-*b*).

In some implementations, the first UCI message 510-*a* may additionally include a TB2 indicator 540 that is used to indicate whether or not the second TB 505-*b* is included within the respective PUSCH message or not. In other words, the TB2 indicator 540 may be set to "1" in cases where the second TB 505-*b* is included in the PUSCH message, or set to "0" in cases where the second TB 505-*b* is not included in the PUSCH message (or vice versa).

In cases where the second TB 505-*b* is omitted from the PUSCH message, the resource configuration 500 illustrated in FIG. 5 may result in a more efficient use of resources (e.g., less overhead) as compared to the resource configuration 400 illustrated in FIG. 4. Specifically, the resource configuration 400 illustrated in FIG. 4 may result in information that is specific to the second TB 405-*b* to be transmitted regardless as to whether the second TB 405-*b* is included in the PUSCH message. In such cases, the third UCI portion 415-*c* may result in wasted resources and increased overhead in cases where the second TB 405-*b* is omitted. Comparatively, in cases where the second TB 505-*b* in FIG. 5 is omitted from the PUSCH messages, the second UCI message 510-*b* would not be transmitted, thereby resulting in lower overhead as compared to the resource configuration 400 in FIG. 4.

Figure 6:
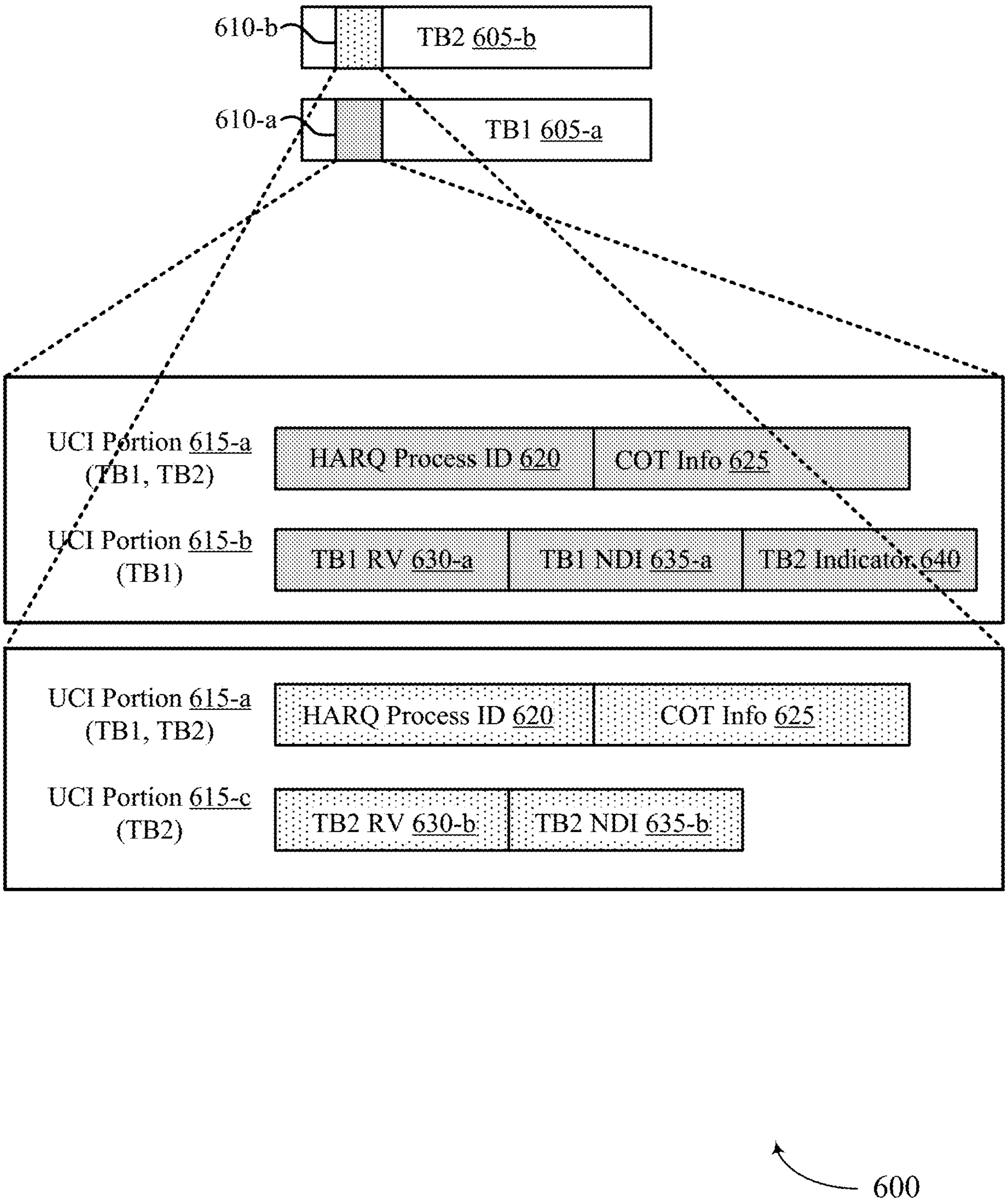
FIG. 6 illustrates an example of a resource configuration that supports techniques for skipping PUSCH occasions with multiple CWs in accordance with one or more aspects of the present disclosure.

FIG. 6 illustrates an example of a resource configuration 600 that supports techniques for skipping PUSCH occasions with multiple CWs in accordance with one or more aspects of the present disclosure. Aspects of the resource configuration 600 may implement, or be implemented by, aspects of the wireless communications system 100, the wireless communications system 200, the CG-PUSCH transmit chain 300, the resource configuration 400, the resource configuration 500, or any combination thereof.

As shown in FIG. 6, a PUSCH message may include a first TB 605-*a* and a second TB 605-*b*. In some implementations, the first TB 605-*a* may include a first UCI message 610-*a*, and the second TB 605-*b* may include a second UCI message 610-*b*. In this example, the first UCI message 610-*a* may include a first UCI portion 615-*a* that includes information that is common across the TBs 605-*a*, 605-*b* (e.g., HARQ process ID 620, COT information 625), and a second UCI portion 615-*b* that includes information that is specific to the first TB 605-*a* (e.g., RV 630-*a*, NDI 635-*a*). In this regard, the common UCI for both TBs 605 and the UCI that is unique to the first TB 605-*a* may be jointly encoded and multiplexed on the first TB 605-*a*.

Similarly, the second UCI message 610-*b* may include the first UCI portion 615-*a* that includes information that is common across the TBs 605-*a*, 605-*b* (e.g., HARQ process ID 620, COT information 625), and a third UCI portion 615-*c* that includes information that is specific to the second TB 605-*b* (e.g., RV 630-*b*, NDI 635-*b*). In this regard, the common UCI for both TBs 605 and the UCI that is unique to the second TB 605-*b* may be jointly encoded and multiplexed on the second TB 605-*b*.

As compared to the resource configuration 500 illustrated in FIG. 5 in which the common UCI is communicated only via the first TB 505-*a*, the common UCI may be repeated across the TBs 605 of the resource configuration 600 illustrated in FIG. 6. Repeating the common information (e.g., first UCI portion 615-*a*) across both TBs 605 may be more robust and may improve the probability that the common UCI is successfully received and decoded by the network.

As noted previously herein, in some implementations, the first UCI message 610-*a* may additionally include a TB2 indicator 640 that is used to indicate whether or not the second TB 605-*b* is included within the respective PUSCH message or not. In other words, the TB2 indicator 640 may be set to "1" in cases where the second TB 605-*b* is included in the PUSCH message, or set to "0" in cases where the second TB 605-*b* is not included in the PUSCH message (or vice versa).

In some aspects, the network may configure or predefine which resource configuration 400, 500, 600 is to be used to generate PUSCH messages. In other words, the control signaling 210 illustrated in FIG. 2 may indicate which resource configuration 40, 500, or 600 (or some other resource configuration) that the UE 115-*a* is to use when generating PUSCH messages 230.

Figure 7:
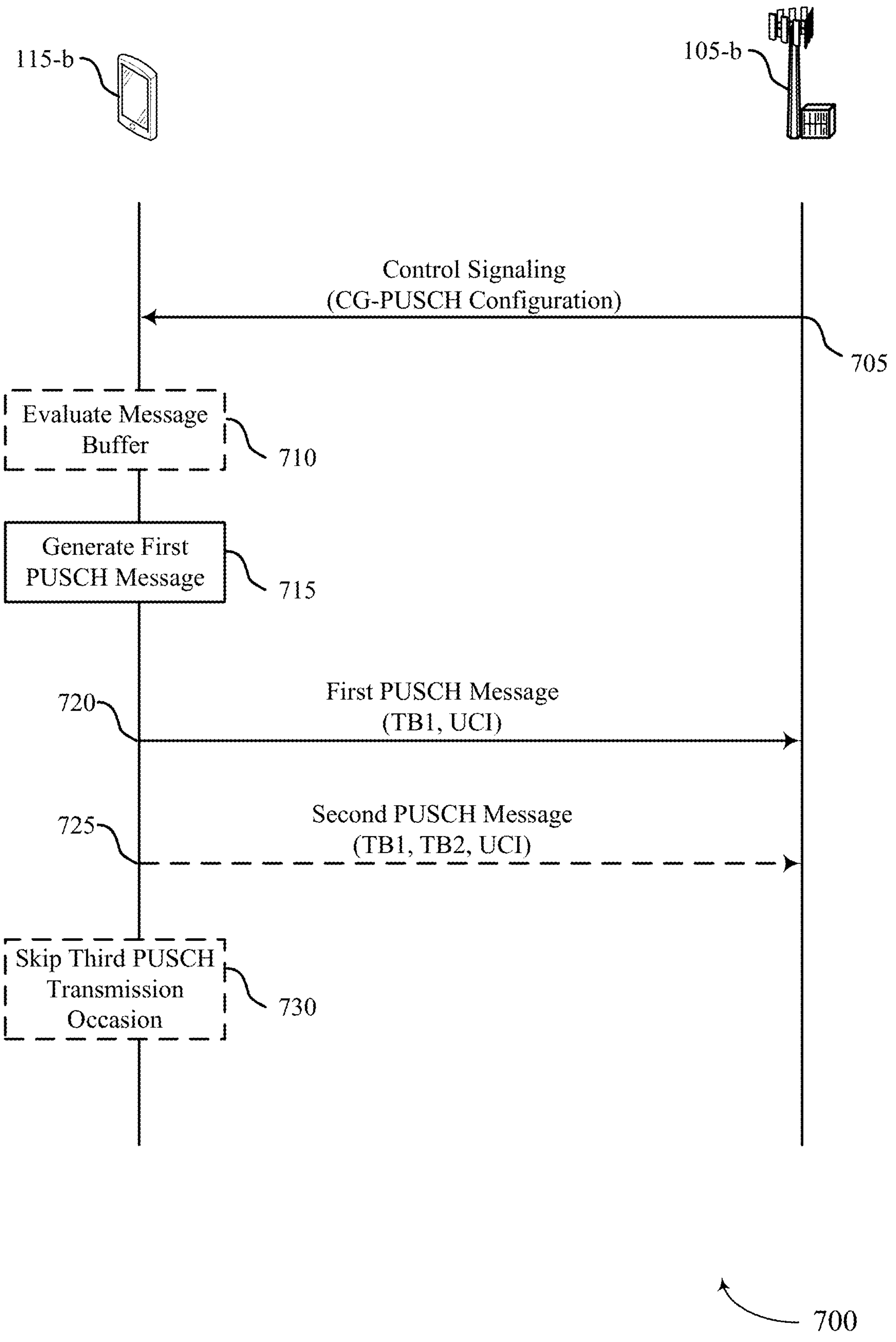
FIG. 7 illustrates an example of a process flow that supports techniques for skipping PUSCH occasions with multiple CWs in accordance with one or more aspects of the present disclosure.

FIG. 7 illustrates an example of a process flow 700 that supports techniques for skipping PUSCH occasions with multiple CWs in accordance with one or more aspects of the present disclosure. Aspects of the process flow 700 may implement, or be implemented by, aspects of the wireless communications system 100, the wireless communications system 200, the CG-PUSCH transmit chain 300, the resource configuration 400, the resource configuration 500, the resource configuration 600, or any combination thereof. For example, the process flow 700 illustrates signaling and configurations that enable a UE 115-*b* to transmit PUSCH messages using less than a maximum quantity of TBs configured for a respective PUSCH transmission occasion, as described previously herein.

The process flow 700 includes a UE 115-*b* and a network entity 105-*b*, which may be examples of UEs 115, network entities 105, and other wireless devices as described herein. For example, the UE 115-*b* and the network entity 105-*b* illustrated in FIG. 7 may include examples of the UE 115-*a* and the network entity 105-*a*, respectively, as illustrated in FIG. 2.

In some examples, the operations illustrated in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 705, the UE 115-*b* may receive, from the network entity 105-*b*, control signaling (e.g., control information) that indicates or schedules a set of uplink shared channel transmission occasions usable by the UE 115-*b*. In other words, the UE 115-*b* may receive control signaling (e.g., RRC signaling, DCI signaling, MAC-CE) that indicates a CG-PUSCH configuration (e.g., Type 1 or Type 2) that includes multiple PUSCH transmission occasions usable by the UE 115-*b* for transmitting PUSCH messages. In some aspects, each of the PUSCH transmission occasions may be enabled with a capacity or communicating a maximum quantity of TBs. For example, the control information may indicate that the PUSCH transmission occasions may be used to communicate up to two, three, four, etc. TBs per PUSCH transmission occasion (e.g., maximum quantity of TBs=2, 3, 4, . . . , etc.).

Much of the present disclosure is described in the context of PUSCH transmission occasions that are enabled for a maximum of two TBs per PUSCH transmission occasion (e.g., TB1 and TB2). However, this is solely for illustrative purposes. In this regard, aspects of the present disclosure may be applied to PUSCH transmission occasions enabled with any number of TBs.

In some aspects, the control signaling may indicate additional parameters or characteristics associated with the CG-PUSCH configuration, PUSCH transmission occasions, supported TBs, and the like. Other information/parameters that may be indicated via the control signaling may include, but are not limited to, MCSs associated with the respective TBs, transmission/communication layers mapped to the respective TBs, rules/conditions indicating when the UE 115-*b* is enabled to transmit fewer than the maximum configured number of TBs, rules/conditions indicating which TB(s) the UE 115-*b* is to drop when transmitting fewer than the maximum configured number of TBs, how UCI is to be divided up across TBs (e.g., which TBs carry which UCI), and the like.

At 710, the UE 115-*b* may evaluate an uplink message buffer at the UE 115-*b*. In other words, the UE 115-*b* may evaluate how much uplink traffic (e.g., how much PUSCH traffic) the UE 115-*b* has to transmit within a message buffer maintained at the UE 115-*b*. In some aspects, the UE 115-*b* may evaluate the message buffer at 710 based on receiving the control signaling at 705. In some aspects, the amount of uplink traffic within the message buffer may be used to determine how many TBs the UE 115-*b* will include within PUSCH messages transmitted via the configured PUSCH transmission occasions (e.g., whether the UE 115-*b* will use the maximum quantity of configured TBs, or less than the maximum quantity of configured TBs).

A 715, the UE 115-*b* may generate a first PUSCH message. In particular, the UE 115-*b* may generate a PUSCH messages that is to be transmitted within a PUSCH transmission occasion configured via the control signaling at 705. In other words, the UE 115-*b* may be configured to generate a PUSCH message in accordance with the received CG-PUSCH configuration. The first PUSCH message may include encoded data stored in the message buffer at the UE 115-*b*.

In some aspects, the UE 115-*b* may generate the first PUSCH message such that the message includes fewer than the maximum quantity of TBs configured for the respective PUSCH transmission occasion. For example, in cases where the CG-PUSCH configuration includes PUSCH transmission occasions that are enabled with two TBs each (TB1 and TB2) (e.g., maximum quantity of TBs=2), the UE 115-*b* may generate the first PUSCH message to include a single TB (e.g., TB1). In this regard, the PUSCH message may include TB1 and omit TB2 such that the message includes fewer than the maximum quantity of TBs for the PUSCH transmission occasion.

In some aspects, the UE 115-*b* may generate the first PUSCH message based on evaluating the message buffer at 710. For example, the UE 115-*b* may generate the first PUSCH message to include less than the maximum quantity of TBs in cases where the message buffer includes a quantity of uplink data that is less than a threshold amount. That is, the UE 115-*b* may skip or omit TBs from the first PUSCH message in cases where the UE 115-*b* does not have at least a threshold amount of data to transmit. For instance, if the quantity of uplink data in the message buffer may be transmitted in a single TB, the UE 115-*b* may generate the first PUSCH message using a single TB despite the respective PUSCH transmission occasion of the first PUSCH message being enabled for two TBs.

In some aspects, the UE 115-*b* may be configured to utilize parameters, rules, and/or conditions configured via the control signaling to determine which TBs to include or omit from the first PUSCH message. In other words, the control signaling (e.g., CG-PUSCH configuration) may define certain parameter, rules, or conditions that the UE 115-*b* is to use to determine when to include fewer TBs than the maximum quantity of TBs, and which TBs should be included in such PUSCH messages.

For example, the UE 115-*b* may be configured to include or omit TBs from the first PUSCH message based on sets of transmission/communication layers mapped to the respective TBs. For instance, in some cases, the first TB (TB1) may be mapped to a first set of transmission layers 1-4, and the second TB (TB2) may be mapped to a second set of transmission layers 5-8. In this example, the UE 115-*b* may generate the first PUSCH message to include the first TB (and omit the second TB) based on the first TB being mapped to the first set of transmission layers (e.g., based on the first TB being mapped to the lower set of transmission layers).

In additional or alternative implementations, the UE 115-*b* may be configured to include the TB (TB1) that is associated with the higher MCS, and may be configured to omit the TB (TB2) that is associated with the lower MCS, where the respective MCSs may be configured via the control signaling at 705. In cases where the first MCS of the first TB and the second MCS of the second TB are the same, the UE 115-*b* may be configured to fall back to some other parameter to determine which TB(s) will be included and which TB(s) will be omitted, such as the transmission layers mapped to the respective TBs. For instance, in cases where the first TB and the second TB are associated with the same MCS, the UE 115-*b* may be configured to include the TB associated with the lower set of transmission layers.

In some aspects, as described previously herein, the UE 115-*b* may generate the first PUSCH message to include UCI. That is, the UE 115-*b* may multiplex one or more PUSCH messages with the first PUSCH message, as shown and described in FIGS. 4-6. In particular, the control signaling at 705 may indicate one or more rules or parameters regarding how UCI is to be encoded within PUSCH messages, and the UE 115-*b* may generate the first PUSCH message in accordance with the rules/parameters. For instance, the control signaling may indicate that the UE 115-*b* is to use one of the resource configurations 400, 500, or 600 to generate PUSCH messages including UCI.

At 720, the UE 115-*b* may transmit the first PUSCH message to the network entity 105-*b* within the PUSCH transmission occasion of the CG-PUSCH configuration. In particular, the UE 115-*b* may transmit the first PUSCH message based on generating the first PUSCH message at 715. In this regard, the first PUSCH message transmitted at 720 may include fewer than the maximum quantity of TBs enabled for the PUSCH transmission occasion. For instance, in cases where the PUSCH transmission occasion is enabled for two TBs (e.g., TB1 and TB2), the first PUSCH message may include TB1, and omit TB2. As such, the UE 115-*b* may transmit the first PUSCH message at 720 based on receiving the control signaling at 705, evaluating the message buffer at 710, generating the first PUSCH message at 715, or any combination thereof.

In some aspects, the first PUSCH message may include one or more bit fields that indicates that the second TB is not included in the first PUSCH message. For example, the first PUSCH message may include one or more bit fields of a TB2 indicator 440, 540, 640 that which indicate that the second TB is not included in the first PUSCH message (so that the network entity 105-*b* knows not to attempt to decode the second TB).

In some aspects, the first PUSCH message may include UCI. That is, the first PUSCH message may be multiplexed with one or more UCI messages, as shown and described in FIGS. 4-6. In some aspects, the network entity 105-*b* may be configured to decode the UCI (e.g., UCI messages), and may subsequently use the decoded UCI to decode the information included within the first PUSCH message.

At 725, the UE 115-*b* may transmit a second PUSCH message to the network entity 105-*b* within a second PUSCH transmission occasion of the CG-PUSCH configuration. In some cases, the second PUSCH message may include the maximum quantity of TBs enabled for the second PUSCH transmission occasion. For example, in cases where the PUSCH transmission occasions of the CG-PUSCH configuration are enabled for two TBs (TB1 and TB2), the second PUSCH message may include both TB1 and TB2. In some cases, the UE 115-*b* may generate the second PUSCH message to include the maximum quantity of TBs based on a quantity of uplink data in the message buffer at the UE 115-*b* satisfying some threshold quantity.

In some aspects, the second PUSCH message may include one or more bit fields that indicates that the second TB is included in the second PUSCH message. For example, the second PUSCH message may include one or more bit fields of a TB2 indicator 440, 540, 640 that which indicate that the second TB is included within the second PUSCH message (so that the network entity 105-*b* knows to decode the second TB).

As noted previously herein with respect to the first PUSCH message, the second PUSCH message at 725 may include UCI. That is, the second PUSCH message may be multiplexed with one or more UCI messages, as shown and described in FIGS. 4-6.

At 730, the UE 115-*b* may skip a third PUSCH transmission occasion of the CG-PUSCH configuration. That is, the UE 115-*b* may refrain from transmitting any PUSCH messages in the third PUSCH transmission occasion. In some cases, the UE 115-*b* may skip the third PUSCH transmission occasion if the UE 115-*b* does not have any uplink data to transmit in the message buffer at the UE 115-*b*.

Techniques described herein may enable the UE 115-*b* to transmit PUSCH messages with fewer TBs/CWs as compared to a maximum quantity of TBs configured for a respective PUSCH transmission occasion. In other words, aspects of the present disclosure may enable the UE 115-*b* to be configured with PUSCH transmission occasions enabled for multiple TBs, but to selectively "drop" or omit one or more TBs from PUSCH messages communicated in the respective PUSCH transmission occasions, such as based on an amount of data to be communicated within a message buffer at the UE 115-*b*. In this regard, as compared to some "binary" rules implemented by some networks in which all configured TBs are either transmitted or dropped in a respective PUSCH occasion, aspects of the present disclosure may enable improved flexibility in the context of CG-PUSCH configurations associated with multiple TBs. Moreover, by enabling the UE 115-*b* to selectively drop TBs from PUSCH messages, techniques described herein may reduce wasted resources and improve resource utilization within the wireless communications system. Further, by enabling the UE 115-*b* to selectively drop TBs from PUSCH messages, aspects of the present disclosure may reduce or eliminate scenarios where the UE 115-*b* is expected to completely drop a PUSCH message, thereby reducing latency within the network.

Figure 8:
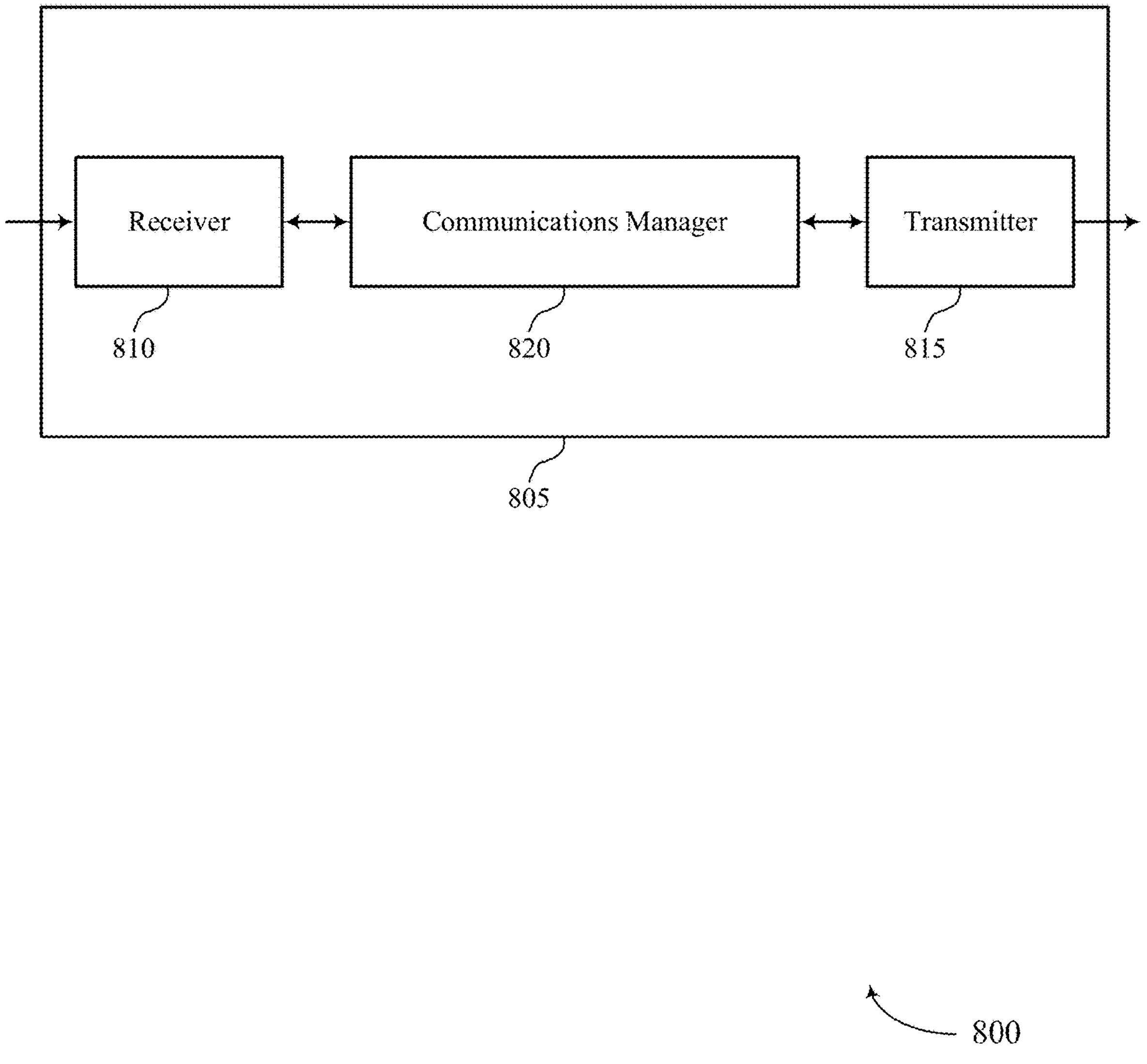
FIGS. 8 and 9 illustrate block diagrams of devices that support techniques for skipping PUSCH occasions with multiple CWs in accordance with one or more aspects of the present disclosure.

FIG. 8 illustrates a block diagram 800 of a device 805 that supports techniques for skipping PUSCH occasions with multiple CWs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for skipping PUSCH occasions with multiple CWs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for skipping PUSCH occasions with multiple CWs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for skipping PUSCH occasions with multiple CWs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for receiving RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The communications manager 820 may be configured as or otherwise support a means for generating an uplink shared channel message in accordance with the RRC signaling, where the uplink shared channel message includes one or more TBs, the one or more TBs being less than the maximum quantity of TBs. The communications manager 820 may be configured as or otherwise support a means for transmitting the uplink shared channel message within an uplink shared channel transmission occasion of the set of multiple uplink shared channel transmission occasions.

By including or configuring the communications manager 820 in accordance with examples as described herein, the device 805 (e.g., a processor controlling or otherwise coupled with the receiver 810, the transmitter 815, the communications manager 820, or a combination thereof) may support techniques that enable UEs 115 to transmit PUSCH messages with fewer TBs/CWs as compared to a maximum quantity of TBs configured for a respective PUSCH transmission occasion. In other words, aspects of the present disclosure may enable UEs 115 to be configured with PUSCH transmission occasions enabled for multiple TBs, but to selectively "drop" or omit one or more TBs from PUSCH messages communicated in the respective PUSCH transmission occasions, such as based on an amount of data to be communicated within a message buffer at the UE 115. In this regard, as compared to some "binary" rules implemented by some networks in which all configured TBs are either transmitted or dropped in a respective PUSCH occasion, aspects of the present disclosure may enable improved flexibility in the context of CG-PUSCH configurations associated with multiple TBs. Moreover, by enabling UEs 115 to selectively drop TBs from PUSCH messages, techniques described herein may reduce wasted resources and improve resource utilization within the wireless communications system. Further, by enabling UEs 115 to selectively drop TBs from PUSCH messages, aspects of the present disclosure may reduce or eliminate scenarios where the UE 115 is expected to completely drop a PUSCH message, thereby reducing latency within the network.

Figure 9:
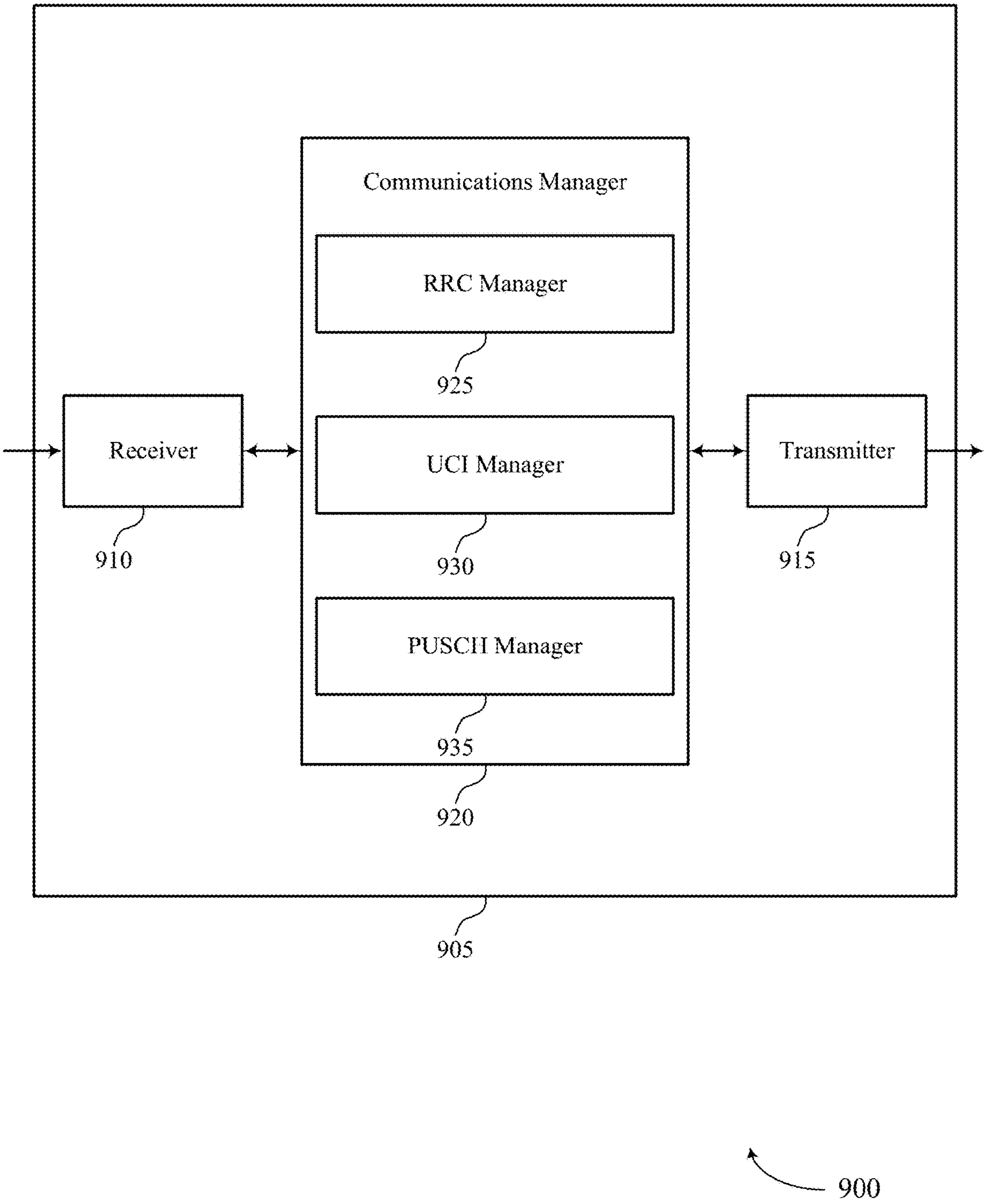

FIG. 9 illustrates a block diagram 900 of a device 905 that supports techniques for skipping PUSCH occasions with multiple CWs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for skipping PUSCH occasions with multiple CWs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for skipping PUSCH occasions with multiple CWs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for skipping PUSCH occasions with multiple CWs as described herein. For example, the communications manager 920 may include an RRC manager 925, a UCI manager 930, an PUSCH manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The RRC manager 925 may be configured as or otherwise support a means for receiving RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The UCI manager 930 may be configured as or otherwise support a means for generating an uplink shared channel message in accordance with the RRC signaling, where the uplink shared channel message includes one or more TBs, the one or more TBs being less than the maximum quantity of TBs. The PUSCH manager 935 may be configured as or otherwise support a means for transmitting the uplink shared channel message within an uplink shared channel transmission occasion of the set of multiple uplink shared channel transmission occasions.

Figure 10:
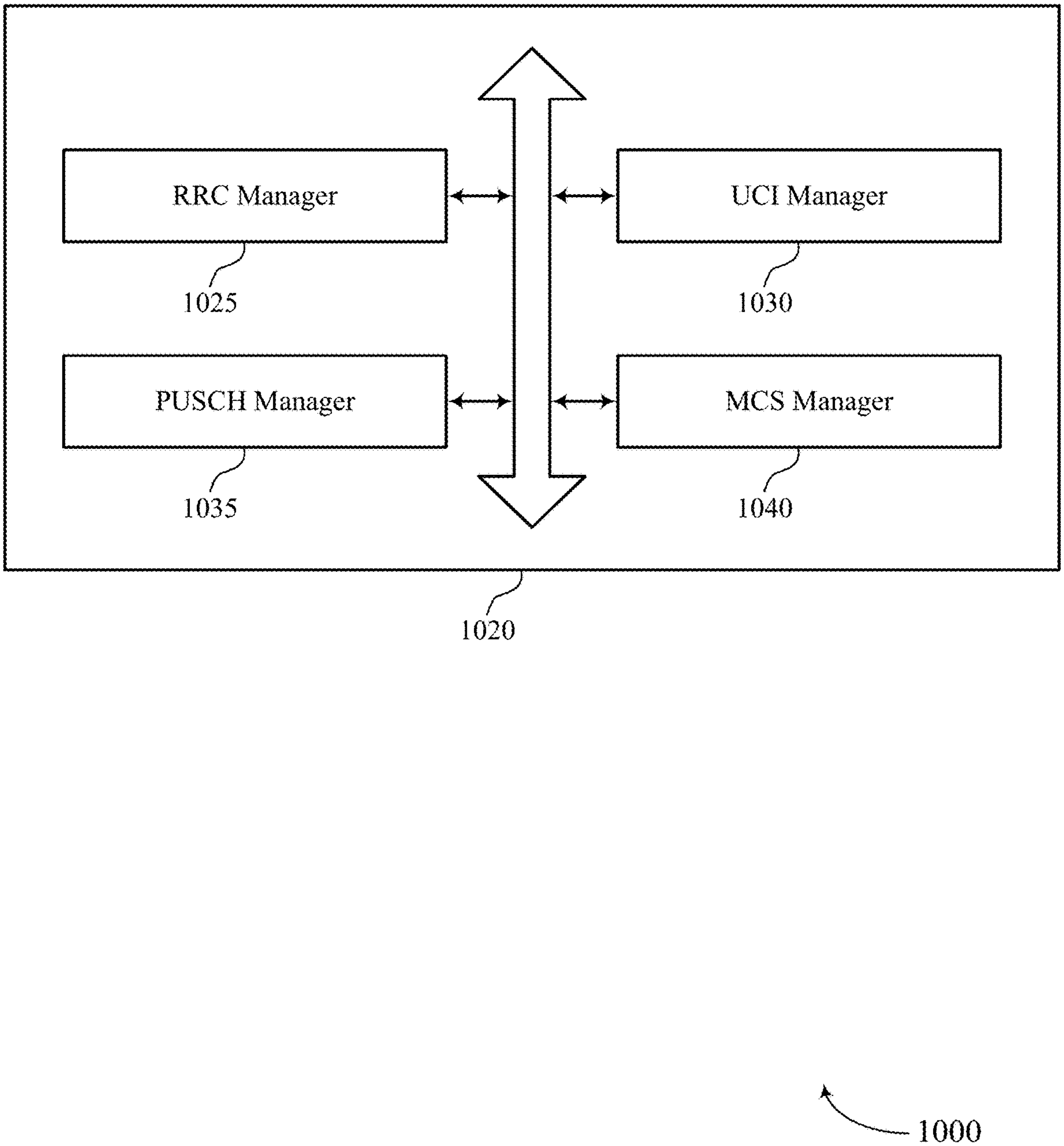
FIG. 10 illustrates a block diagram of a communications manager that supports techniques for skipping PUSCH occasions with multiple CWs in accordance with one or more aspects of the present disclosure.

FIG. 10 illustrates a block diagram 1000 of a communications manager 1020 that supports techniques for skipping PUSCH occasions with multiple CWs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for skipping PUSCH occasions with multiple CWs as described herein. For example, the communications manager 1020 may include an RRC manager 1025, a UCI manager 1030, an PUSCH manager 1035, an MCS manager 1040, or any combination thereof. Each of these components may communicate, directly or indirectly, with one another (e.g., via one or more buses).

The RRC manager 1025 may be configured as or otherwise support a means for receiving RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The UCI manager 1030 may be configured as or otherwise support a means for generating an uplink shared channel message in accordance with the RRC signaling, where the uplink shared channel message includes one or more TBs, the one or more TBs being less than the maximum quantity of TBs. The PUSCH manager 1035 may be configured as or otherwise support a means for transmitting the uplink shared channel message within an uplink shared channel transmission occasion of the set of multiple uplink shared channel transmission occasions.

In some examples, the MCS manager 1040 may be configured as or otherwise support a means for receiving, via the RRC signaling, additional control signaling, or both, an indication of a first MCS associated with a first TB, and a second MCS associated with a second TB, where the uplink shared channel message includes the first TB in the one or more TBs and omits the second TB from the one or more TBs based on a comparison of the first MCS and the second MCS.

In some examples, the uplink shared channel message includes the first TB and omits the second TB based on the first MCS being greater than the second MCS.

In some examples, the uplink shared channel message includes the first TB and omits the second TB based on the first MCS being the same as the second MCS and on a comparison of transmission layers associated with the first TB and the second TB.

In some examples, the uplink shared channel message includes a first TB in the one or more TBs and omits a second TB from the one or more TBs based on the first TB being associated with a first set of transmission layers and the second TB being associated with a second set of transmission layers.

In some examples, the uplink shared channel message includes the first TB and omits the second TB based on the first set of transmission layers being lower than the second set of transmission layers.

In some examples, the first set of transmission layers includes transmission layers one through four. In some examples, the second set of transmission layers includes transmission layers five through eight.

In some examples, the UCI manager 1030 may be configured as or otherwise support a means for transmitting a UCI message via the first TB of the uplink shared channel message, where the UCI message includes a bit field value that indicates whether a second TB is included within the one or more TBs of the uplink shared channel message.

In some examples, the UCI message includes first information that is common across the first TB and the second TB, second information that is unique to the first TB, and third information that is unique to the second TB.

In some examples, the first information includes a HARQ process identifier, COT sharing information, or both. In some examples, the second information includes a first RV associated with the first TB, a first NDI associated with the first TB, or both. In some examples, the third information includes a second RV associated with the second TB, a second NDI associated with the second TB, or both.

In some examples, the UCI manager 1030 may be configured as or otherwise support a means for transmitting a first UCI message via the first TB of the uplink shared channel message, where the first UCI message includes first information that is common across the first TB and a second TB, and second information that is unique to the first TB.

In some examples, the first UCI message further includes a bit field value indicating that the second TB is included within the one or more TBs of the uplink shared channel message.

In some examples, the UCI manager 1030 may be configured as or otherwise support a means for transmitting a second UCI message via the second TB of the uplink shared channel message, where the second UCI message includes third information that is unique to the second TB.

In some examples, the second UCI message further includes the first information that is common across the first TB and the second TB.

In some examples, the PUSCH manager 1035 may be configured as or otherwise support a means for transmitting a second uplink shared channel message within a second uplink shared channel transmission occasion of the set of multiple uplink shared channel transmission occasions, where the second uplink shared channel message includes the maximum quantity of TBs.

In some examples, to support generating the uplink shared channel message, the PUSCH manager 1035 may be configured as or otherwise support a means for generating the uplink shared channel message to include less than the maximum quantity of TBs based on a quantity of uplink traffic within a message buffer at the UE being less than a threshold quantity.

Figure 11:
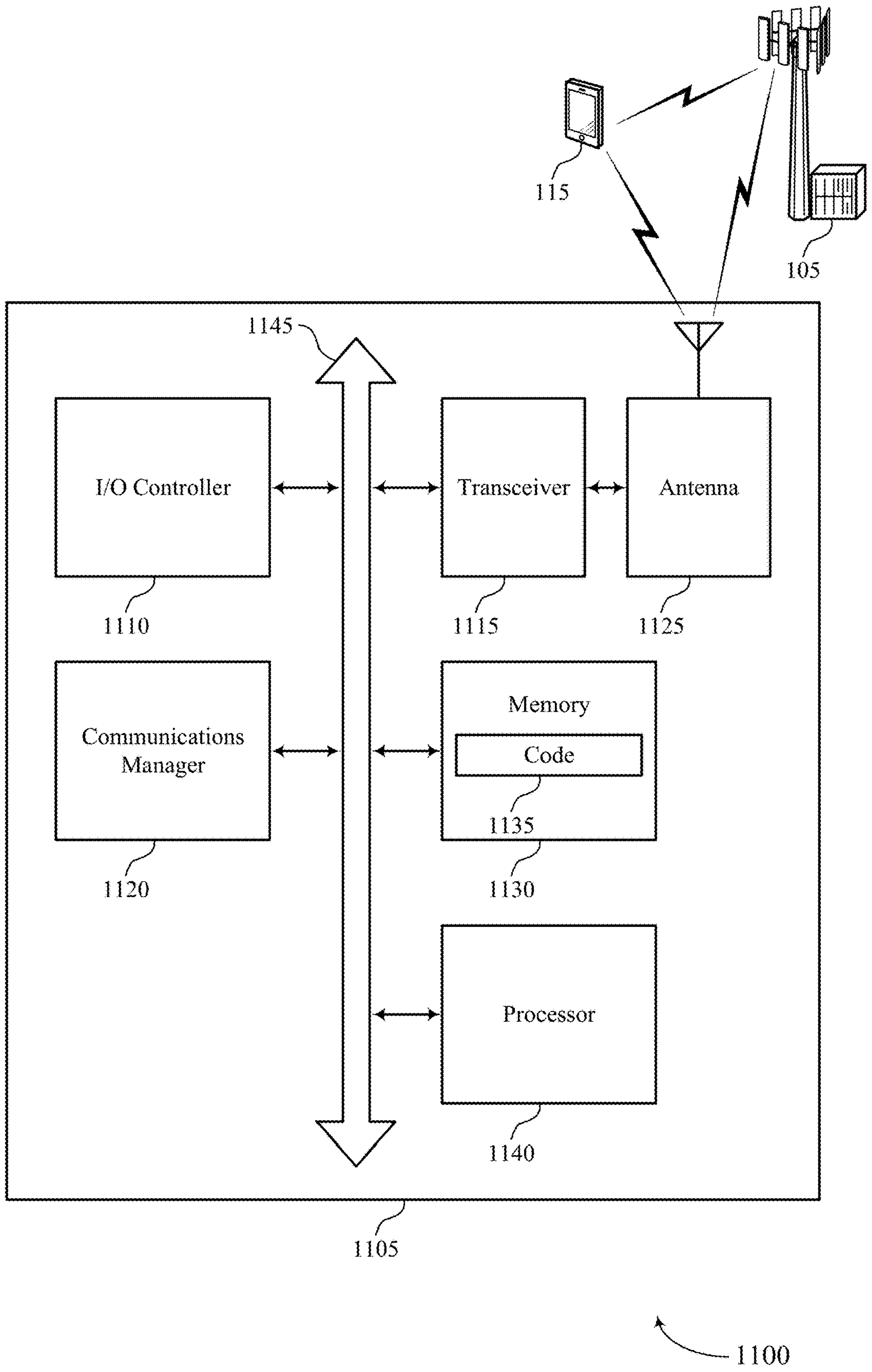
FIG. 11 illustrates a diagram of a system including a device that supports techniques for skipping PUSCH occasions with multiple CWs in accordance with one or more aspects of the present disclosure.

FIG. 11 illustrates a diagram of a system 1100 including a device 1105 that supports techniques for skipping PUSCH occasions with multiple CWs in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for skipping PUSCH occasions with multiple CWs). For example, the device 1105 or a component of the device 1105 may include a processor 1140 and memory 1130 coupled with or to the processor 1140, the processor 1140 and memory 1130 configured to perform various functions described herein.

For example, the communications manager 1120 may be configured as or otherwise support a means for receiving RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The communications manager 1120 may be configured as or otherwise support a means for generating an uplink shared channel message in accordance with the RRC signaling, where the uplink shared channel message includes one or more TBs, the one or more TBs being less than the maximum quantity of TBs. The communications manager 1120 may be configured as or otherwise support a means for transmitting the uplink shared channel message within an uplink shared channel transmission occasion of the set of multiple uplink shared channel transmission occasions.

By including or configuring the communications manager 1120 in accordance with examples as described herein, the device 1105 may support techniques that enable UEs 115 to transmit PUSCH messages with fewer TBs/CWs as compared to a maximum quantity of TBs configured for a respective PUSCH transmission occasion. In other words, aspects of the present disclosure may enable UEs 115 to be configured with PUSCH transmission occasions enabled for multiple TBs, but to selectively "drop" or omit one or more TBs from PUSCH messages communicated in the respective PUSCH transmission occasions, such as based on an amount of data to be communicated within a message buffer at the UE 115. In this regard, as compared to some "binary" rules implemented by some networks in which all configured TBs are either transmitted or dropped in a respective PUSCH occasion, aspects of the present disclosure may enable improved flexibility in the context of CG-PUSCH configurations associated with multiple TBs. Moreover, by enabling UEs 115 to selectively drop TBs from PUSCH messages, techniques described herein may reduce wasted resources and improve resource utilization within the wireless communications system. Further, by enabling UEs 115 to selectively drop TBs from PUSCH messages, aspects of the present disclosure may reduce or eliminate scenarios where the UE 115 is expected to completely drop a PUSCH message, thereby reducing latency within the network.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for skipping PUSCH occasions with multiple CWs as described herein, or the processor 1140 and the memory 1130 may be otherwise configured to perform or support such operations.

Figure 12:
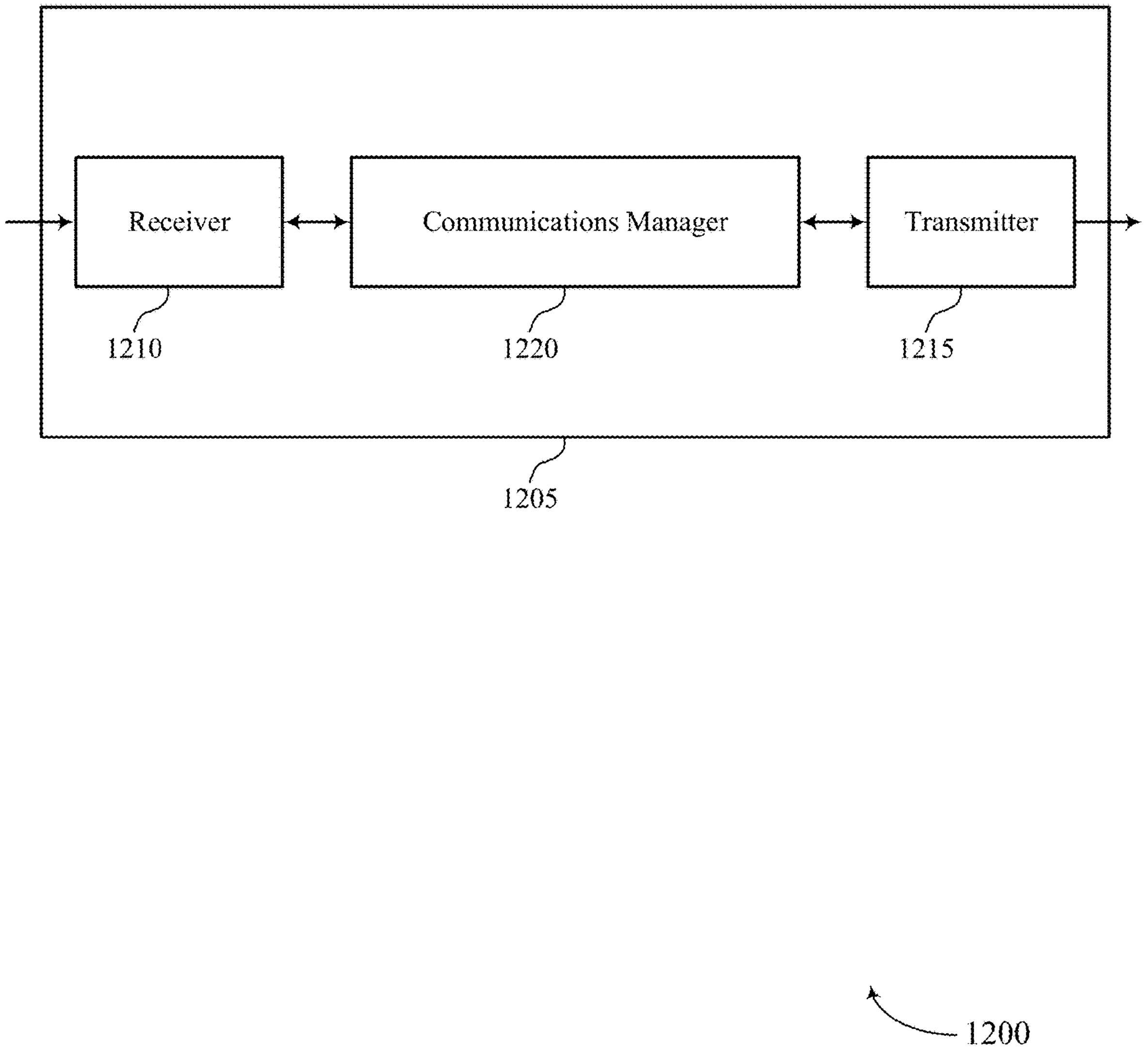
FIGS. 12 and 13 illustrate block diagrams of devices that support techniques for skipping PUSCH occasions with multiple CWs in accordance with one or more aspects of the present disclosure.

FIG. 12 illustrates a block diagram 1200 of a device 1205 that supports techniques for skipping PUSCH occasions with multiple CWs in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of techniques for skipping PUSCH occasions with multiple CWs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor (e.g., processor-executable code), the functions of the communications manager 1220, the receiver 1210, the transmitter 1215, or various combinations or components thereof may be performed (individually or collectively) by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver

1210, send information to the transmitter 1215, or be integrated in combination with the receiver 1210, the transmitter 1215, or both to obtain information, output information, or perform various other operations as described herein.

For example, the communications manager 1220 may be configured as or otherwise support a means for transmitting RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The communications manager 1220 may be configured as or otherwise support a means for receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques that enable UEs 115 to transmit PUSCH messages with fewer TBs/CWs as compared to a maximum quantity of TBs configured for a respective PUSCH transmission occasion. In other words, aspects of the present disclosure may enable UEs 115 to be configured with PUSCH transmission occasions enabled for multiple TBs, but to selectively "drop" or omit one or more TBs from PUSCH messages communicated in the respective PUSCH transmission occasions, such as based on an amount of data to be communicated within a message buffer at the UE 115. In this regard, as compared to some "binary" rules implemented by some networks in which all configured TBs are either transmitted or dropped in a respective PUSCH occasion, aspects of the present disclosure may enable improved flexibility in the context of CG-PUSCH configurations associated with multiple TBs. Moreover, by enabling UEs 115 to selectively drop TBs from PUSCH messages, techniques described herein may reduce wasted resources and improve resource utilization within the wireless communications system. Further, by enabling UEs 115 to selectively drop TBs from PUSCH messages, aspects of the present disclosure may reduce or eliminate scenarios where the UE 115 is expected to completely drop a PUSCH message, thereby reducing latency within the network.

Figure 13:
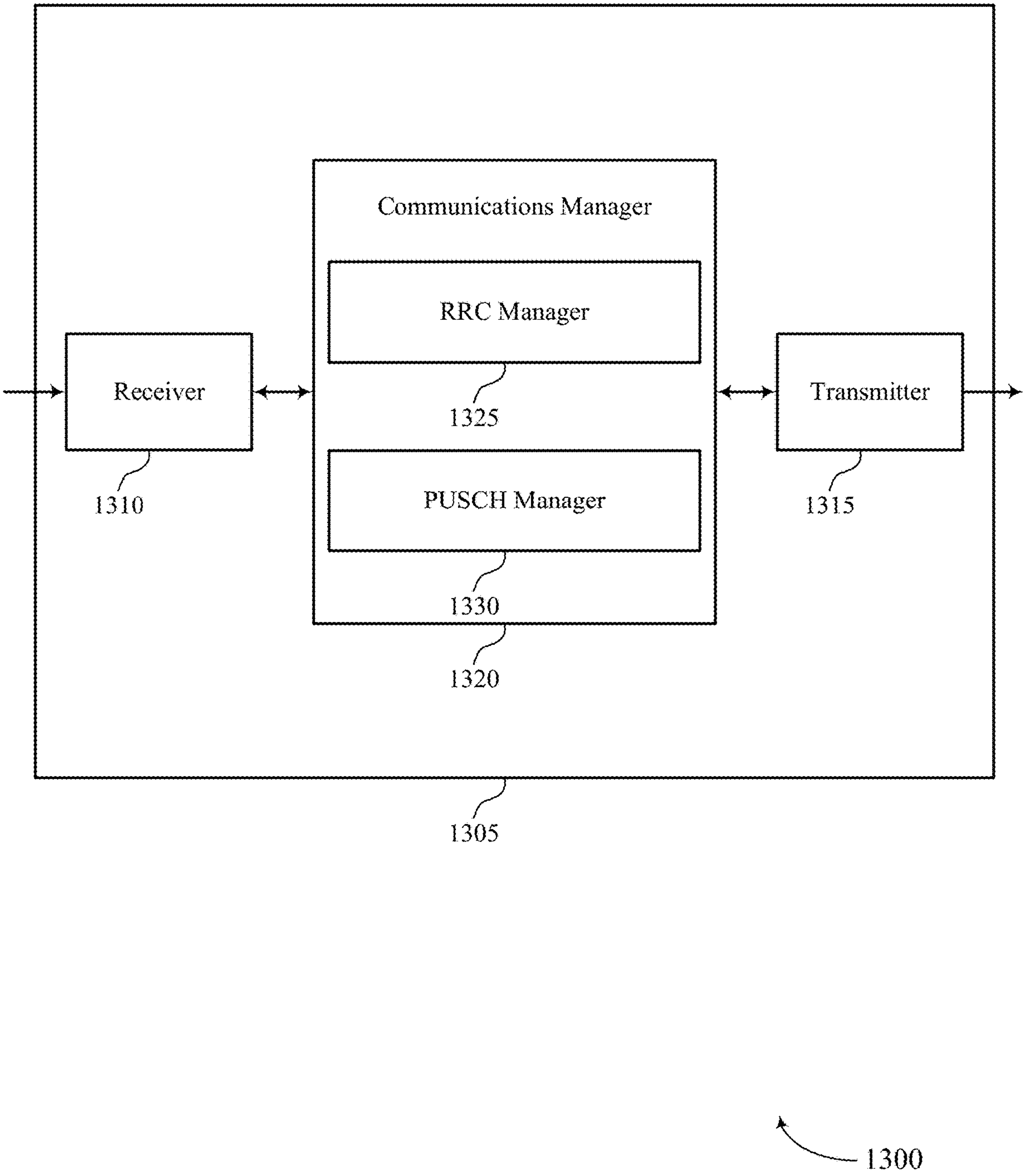

FIG. 13 illustrates a block diagram 1300 of a device 1305 that supports techniques for skipping PUSCH occasions with multiple CWs in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for skipping PUSCH occasions with multiple CWs as described herein. For example, the communications manager 1320 may include an RRC manager 1325 an PUSCH manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The RRC manager 1325 may be configured as or otherwise support a means for transmitting RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The PUSCH manager 1330 may be configured as or otherwise support a means for receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

Figure 14:
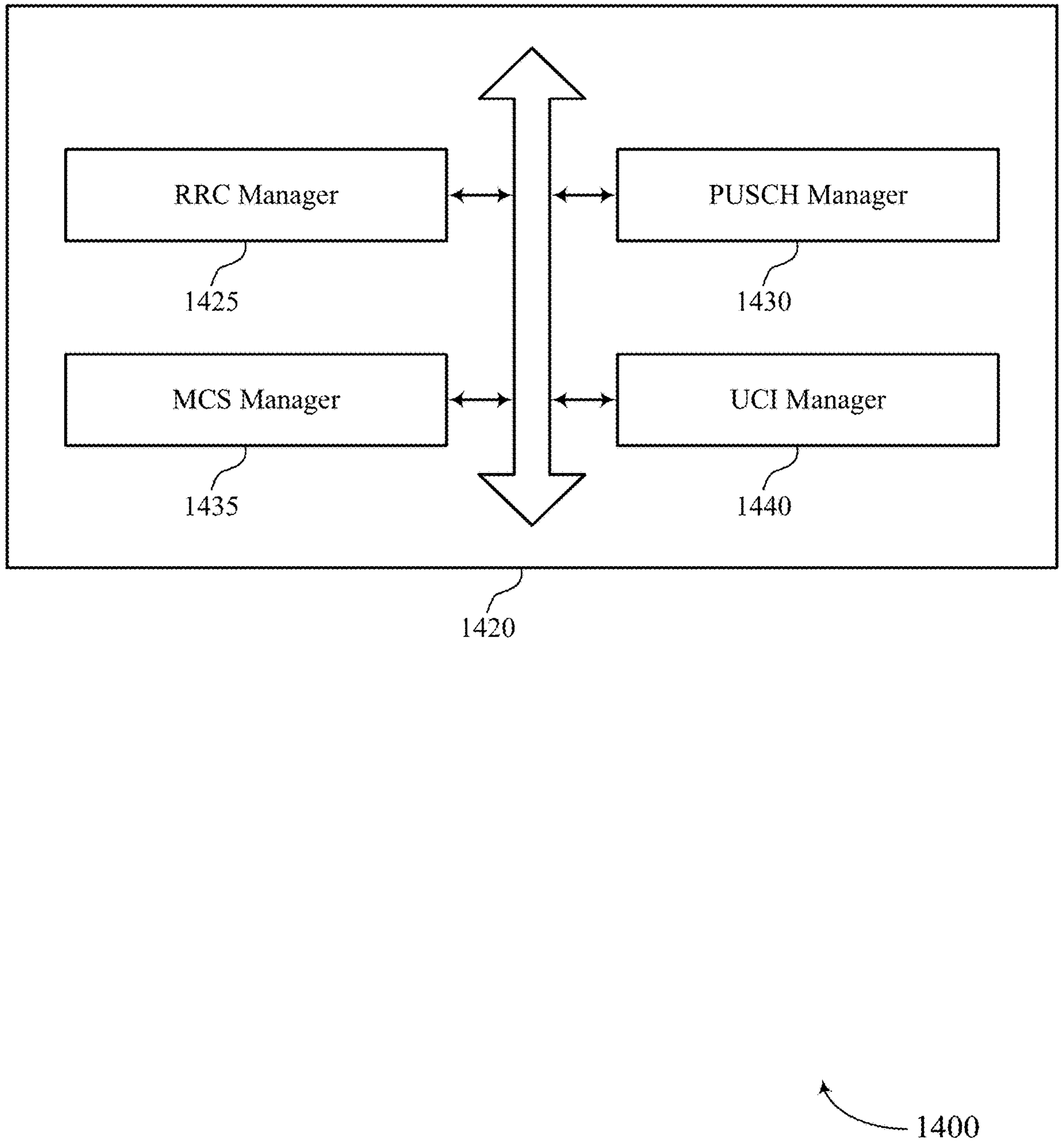
FIG. 14 illustrates a block diagram of a communications manager that supports techniques for skipping PUSCH occasions with multiple CWs in accordance with one or more aspects of the present disclosure.

FIG. 14 illustrates a block diagram 1400 of a communications manager 1420 that supports techniques for skipping PUSCH occasions with multiple CWs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for skipping PUSCH occasions with multiple CWs as described herein. For example, the communications manager 1420 may include an RRC manager 1425, an PUSCH manager 1430, an MCS manager 1435, a UCI manager 1440, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The RRC manager 1425 may be configured as or otherwise support a means for transmitting RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The PUSCH manager 1430 may be configured as or otherwise support a means for receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

In some examples, the MCS manager 1435 may be configured as or otherwise support a means for transmitting, via the RRC signaling, additional control signaling, or both, an indication of a first MCS associated with a first TB, and a second MCS associated with a second TB, where the uplink shared channel message includes the first TB in the one or more TBs and omits the second TB from the one or more TBs based on a comparison of the first MCS and the second MCS.

In some examples, the uplink shared channel message includes the first TB and omits the second TB based on the first MCS being greater than the second MCS.

In some examples, the uplink shared channel message includes the first TB and omits the second TB based on the first MCS being the same as the second MCS and on a comparison of transmission layers associated with the first TB and the second TB.

In some examples, the uplink shared channel message includes a first TB in the one or more TBs and omits a second TB from the one or more TBs based on the first TB being associated with a first set of transmission layers and the second TB being associated with a second set of transmission layers.

In some examples, the uplink shared channel message includes the first TB and omits the second TB based on the first set of transmission layers being lower than the second set of transmission layers.

In some examples, the first set of transmission layers includes transmission layers one through four. In some examples, the second set of transmission layers includes transmission layers five through eight.

In some examples, the one or more TBs included within the uplink shared channel message includes at least a first TB, and the UCI manager 1440 may be configured as or otherwise support a means for receiving a UCI message via the first TB of the uplink shared channel message, where the UCI message includes a bit field value that indicates whether a second TB is included within the one or more TBs of the uplink shared channel message.

In some examples, the UCI message includes first information that is common across the first TB and the second TB, second information that is unique to the first TB, and third information that is unique to the second TB.

In some examples, the first information includes a HARQ process identifier, COT sharing information, or both. In some examples, the second information includes a first RV associated with the first TB, a first NDI associated with the first TB, or both. In some examples, the third information includes a second RV associated with the second TB, a second NDI associated with the second TB, or both.

In some examples, the one or more TBs included within the uplink shared channel message includes a first TB, and the PUSCH manager 1430 may be configured as or otherwise support a means for receiving a first UCI message via the first TB of the uplink shared channel message, where the first UCI message includes first information that is common across the first TB and a second TB, and second information that is unique to the first TB.

In some examples, the first UCI message further includes a bit field value indicating that the second TB is included within the one or more TBs of the uplink shared channel message.

In some examples, the one or more TBs included within the uplink shared channel message includes the second TB, and the UCI manager 1440 may be configured as or otherwise support a means for receiving a second UCI message via the second TB of the uplink shared channel message, where the second UCI message includes third information that is unique to the second TB.

In some examples, the second UCI message further includes the first information that is common across the first TB and the second TB.

In some examples, the PUSCH manager 1430 may be configured as or otherwise support a means for receiving a second uplink shared channel message within a second uplink shared channel transmission occasion of the set of multiple uplink shared channel transmission occasions, where the second uplink shared channel message includes the maximum quantity of TBs.

Figure 15:
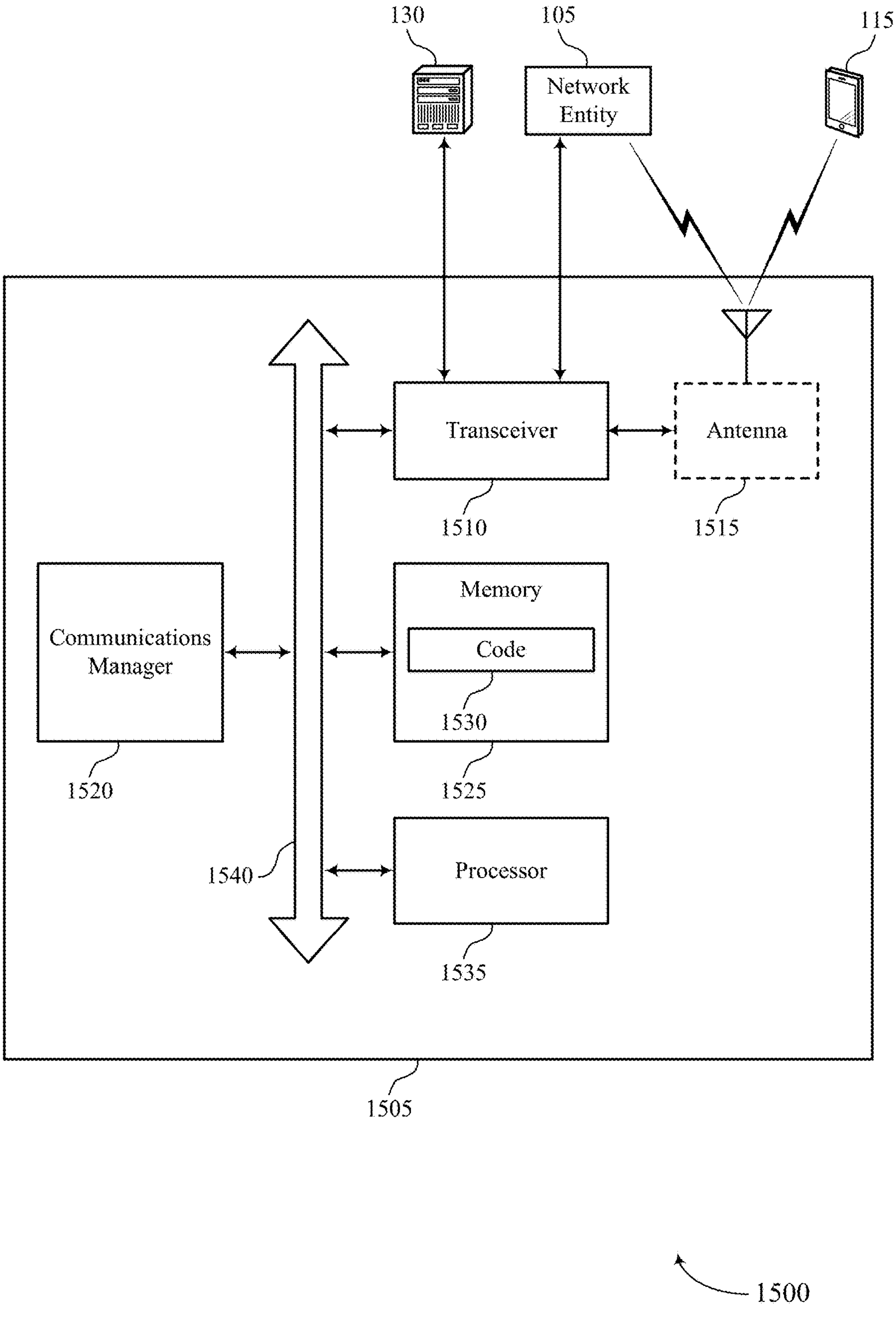
FIG. 15 illustrates a diagram of a system including a device that supports techniques for skipping PUSCH occasions with multiple CWs in accordance with one or more aspects of the present disclosure.

FIG. 15 illustrates a diagram of a system 1500 including a device 1505 that supports techniques for skipping PUSCH occasions with multiple CWs in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting techniques for skipping PUSCH occasions with multiple CWs). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

For example, the communications manager 1520 may be configured as or otherwise support a means for transmitting RRC signaling that schedules resources for a set of multiple uplink shared channel transmission occasions, each of the set of multiple uplink shared channel transmission occasions scheduled with a capacity for transmission of a maximum quantity of TBs, the maximum quantity including two or more TBs. The communications manager 1520 may be configured as or otherwise support a means for receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs.

By including or configuring the communications manager 1520 in accordance with examples as described herein, the device 1505 may support techniques that enable UEs 115 to transmit PUSCH messages with fewer TBs/CWs as compared to a maximum quantity of TBs configured for a respective PUSCH transmission occasion. In other words, aspects of the present disclosure may enable UEs 115 to be configured with PUSCH transmission occasions enabled for multiple TBs, but to selectively "drop" or omit one or more TBs from PUSCH messages communicated in the respective PUSCH transmission occasions, such as based on an amount of data to be communicated within a message buffer at the UE 115. In this regard, as compared to some "binary" rules implemented by some networks in which all configured TBs are either transmitted or dropped in a respective PUSCH occasion, aspects of the present disclosure may enable improved flexibility in the context of CG-PUSCH configurations associated with multiple TBs. Moreover, by enabling UEs 115 to selectively drop TBs from PUSCH messages, techniques described herein may reduce wasted resources and improve resource utilization within the wireless communications system. Further, by enabling UEs 115 to selectively drop TBs from PUSCH messages, aspects of the present disclosure may reduce or eliminate scenarios where the UE 115 is expected to completely drop a PUSCH message, thereby reducing latency within the network.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of techniques for skipping PUSCH occasions with multiple CWs as described herein, or the processor 1535 and the memory 1525 may be otherwise configured to perform or support such operations.

Figure 16:
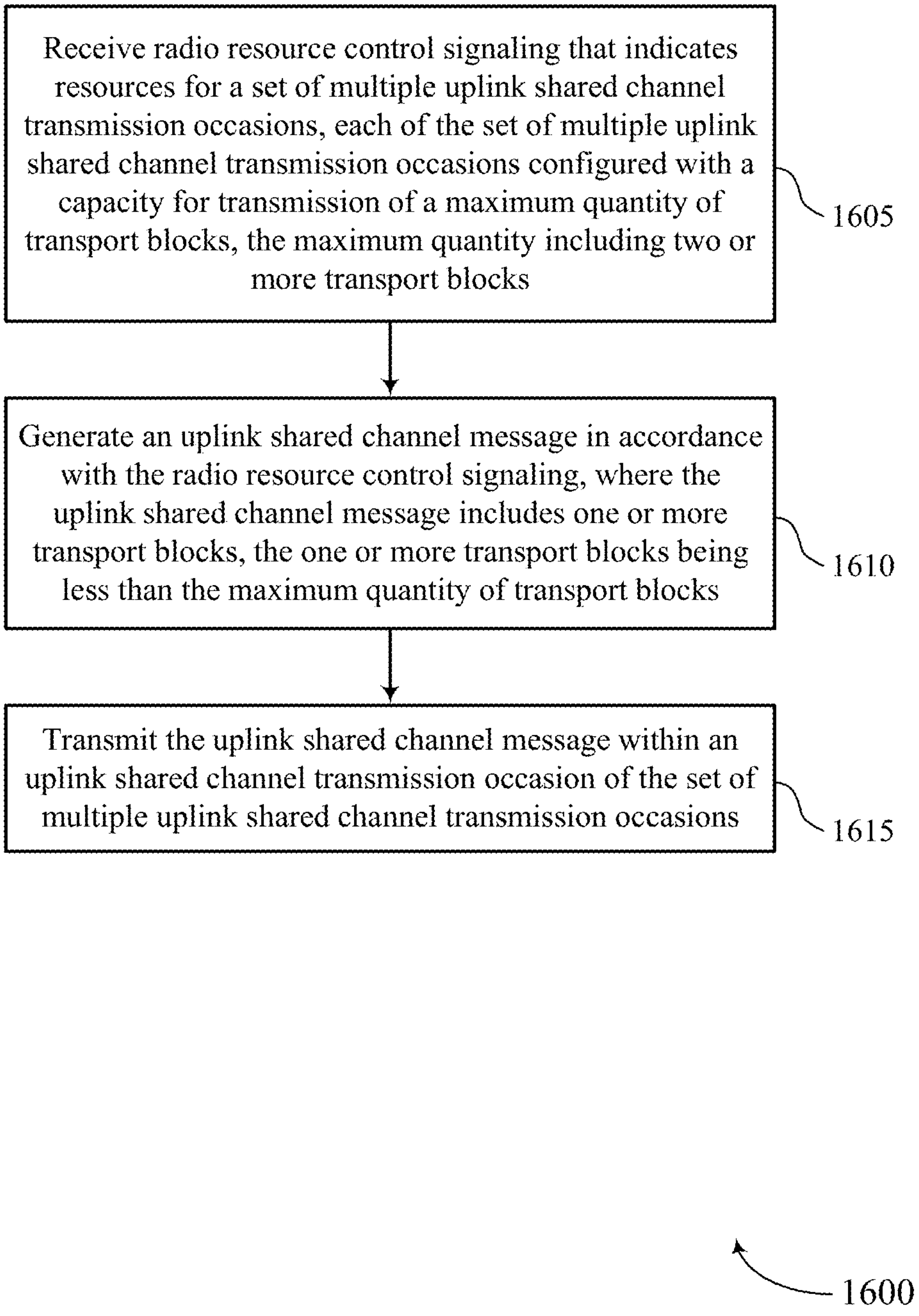
FIGS. 16 through 18 illustrate flowcharts showing methods that support techniques for skipping PUSCH occasions with multiple CWs in accordance with one or more aspects of the present disclosure.

FIG. 16 illustrates a flowchart showing a method 1600 that supports techniques for skipping PUSCH occasions with multiple CWs in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving RRC signaling that indicates (e.g., schedules, configures) resources for a set of multiple uplink shared channel transmission occasions, each of the set of multiple uplink shared channel transmission occasions configured with a capacity for transmission of a maximum quantity of TBs, the maximum quantity including two or more TBs. The operations of 1605 may be performed in accordance with examples as disclosed herein. In some examples, aspects of the operations of 1605 may be performed by an RRC manager 1025 as described with reference to FIG. 10.

At 1610, the method may include generating an uplink shared channel message in accordance with the RRC signaling, where the uplink shared channel message includes one or more TBs, the one or more TBs being less than the maximum quantity of TBs. The operations of 1610 may be performed in accordance with examples as disclosed herein. In some examples, aspects of the operations of 1610 may be performed by a UCI manager 1030 as described with reference to FIG. 10.

At 1615, the method may include transmitting the uplink shared channel message within an uplink shared channel transmission occasion of the set of multiple uplink shared channel transmission occasions. The operations of 1615 may be performed in accordance with examples as disclosed herein. In some examples, aspects of the operations of 1615 may be performed by an PUSCH manager 1035 as described with reference to FIG. 10.

Figure 17:
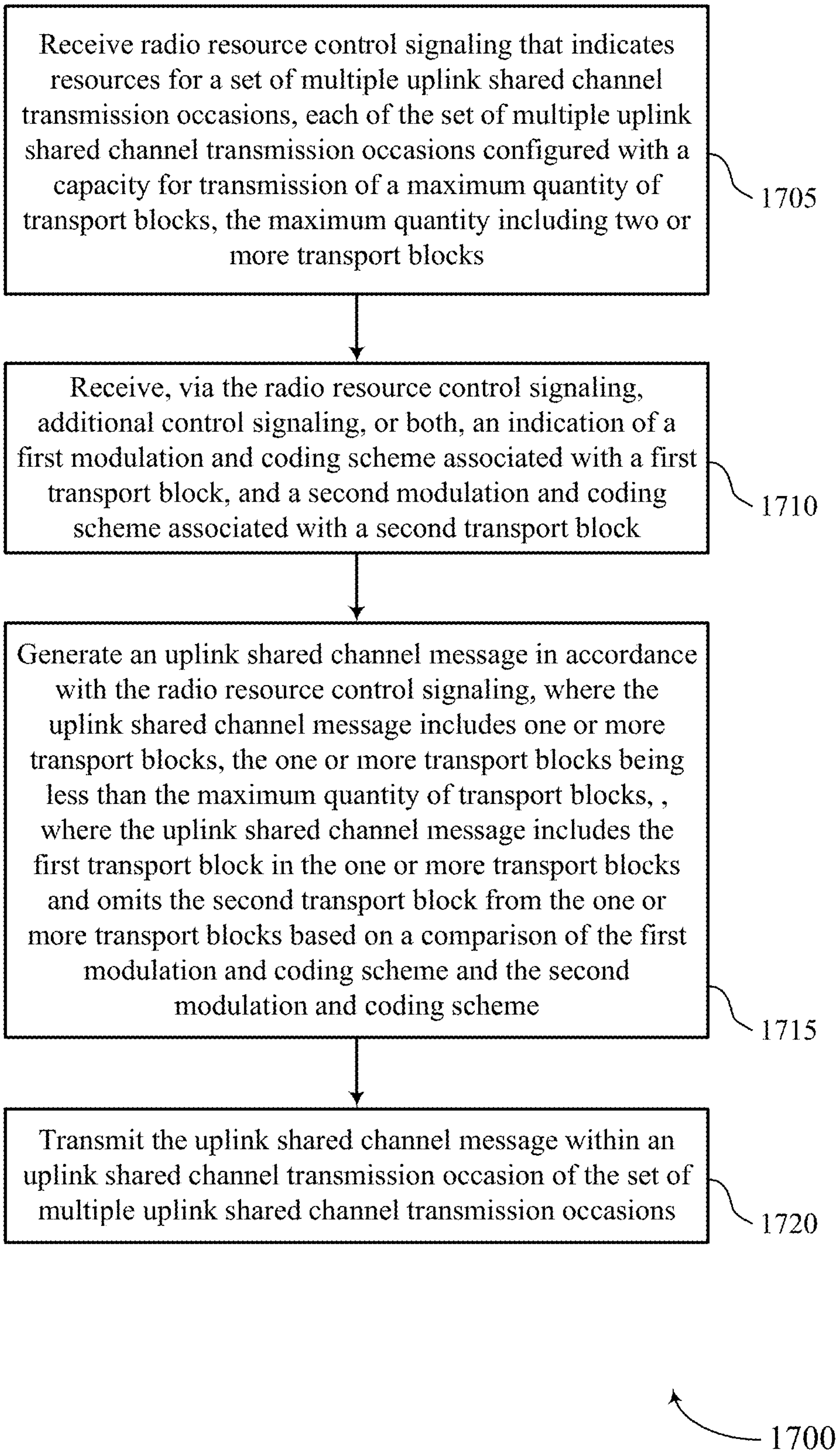

FIG. 17 illustrates a flowchart showing a method 1700 that supports techniques for skipping PUSCH occasions with multiple CWs in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving RRC signaling that indicates resources for a set of multiple uplink shared channel transmission occasions, each of the set of multiple uplink shared channel transmission occasions configured with a capacity for transmission of a maximum quantity of TBs, the maximum quantity including two or more TBs. The operations of 1705 may be performed in accordance with examples as disclosed herein. In some examples, aspects of the operations of 1705 may be performed by an RRC manager 1025 as described with reference to FIG. 10.

At 1710, the method may include receiving, via the RRC signaling, additional control signaling, or both, an indication of a first MCS associated with a first TB, and a second MCS associated with a second TB. The operations of 1710 may be performed in accordance with examples as disclosed herein. In some examples, aspects of the operations of 1710 may be performed by an MCS manager 1040 as described with reference to FIG. 10.

At 1715, the method may include generating an uplink shared channel message in accordance with the RRC signaling, where the uplink shared channel message includes one or more TBs, the one or more TBs being less than the maximum quantity of TBs, where the uplink shared channel message includes the first TB in the one or more TBs and omits the second TB from the one or more TBs based on a comparison of the first MCS and the second MCS. The operations of 1715 may be performed in accordance with examples as disclosed herein. In some examples, aspects of the operations of 1715 may be performed by a UCI manager 1030 as described with reference to FIG. 10.

At 1720, the method may include transmitting the uplink shared channel message within an uplink shared channel transmission occasion of the set of multiple uplink shared channel transmission occasions. The operations of 1720 may be performed in accordance with examples as disclosed herein. In some examples, aspects of the operations of 1720 may be performed by an PUSCH manager 1035 as described with reference to FIG. 10.

Figure 18:
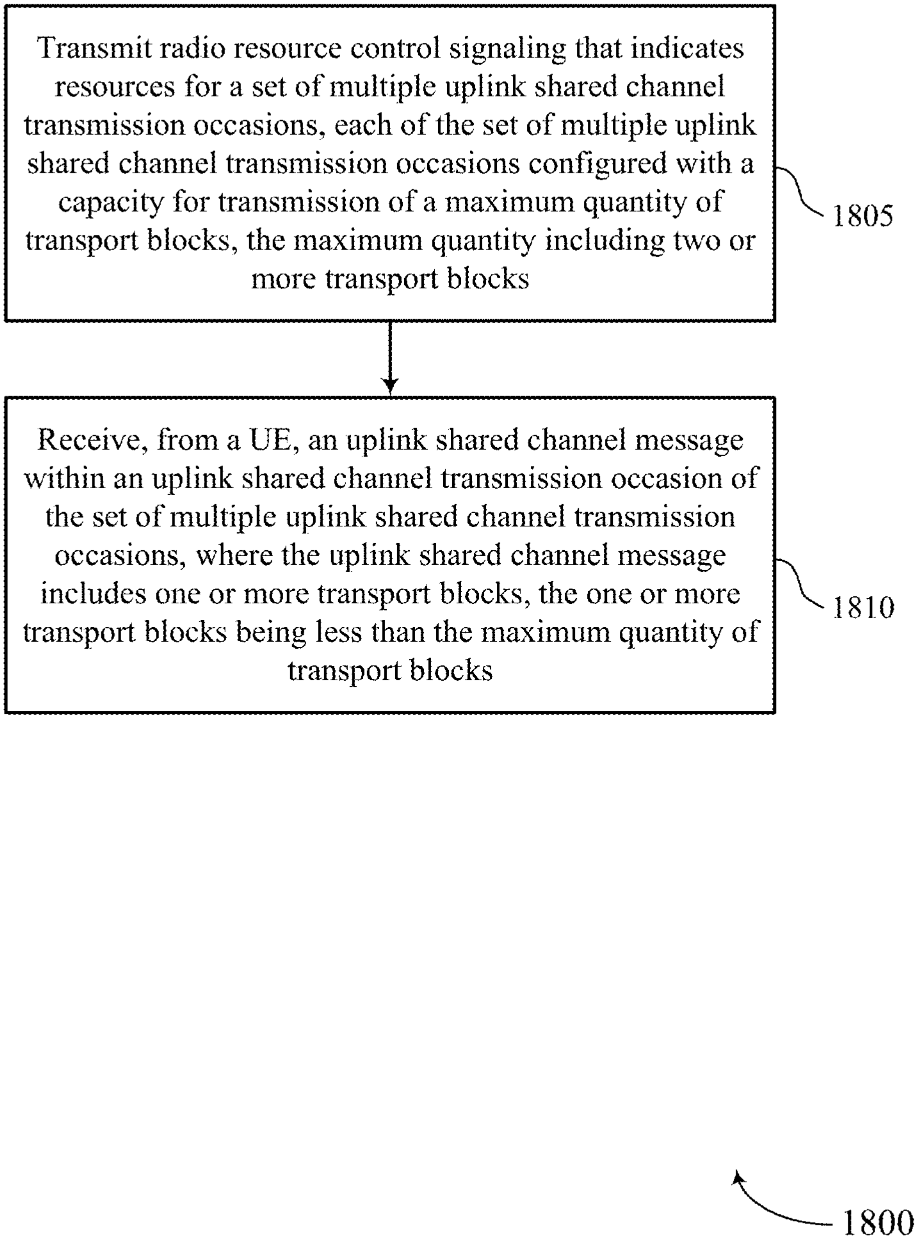

FIG. 18 illustrates a flowchart showing a method 1800 that supports techniques for skipping PUSCH occasions with multiple CWs in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting RRC signaling that indicates resources for a set of multiple uplink shared channel transmission occasions, each of the set of multiple uplink shared channel transmission occasions configured with a capacity for transmission of a maximum quantity of TBs, the maximum quantity including two or more TBs. The operations of 1805 may be performed in accordance with examples as disclosed herein. In some examples, aspects of the operations of 1805 may be performed by an RRC manager 1425 as described with reference to FIG. 14.

At 1810, the method may include receiving, from a UE, an uplink shared channel message within an uplink shared channel transmission occasion of the set of multiple uplink shared channel transmission occasions, where the uplink shared channel message includes one or more TBs, the one or more TBs being less than the maximum quantity of TBs. The operations of 1810 may be performed in accordance with examples as disclosed herein. In some examples, aspects of the operations of 1810 may be performed by an PUSCH manager 1430 as described with reference to FIG. 14.

The following provides an overview of aspects of the present disclosure:

Aspect 1: A method for wireless communication at a UE, comprising: receiving RRC signaling that schedules resources for a plurality of uplink shared channel transmission occasions, each of the plurality of uplink shared channel transmission occasions scheduled with a capacity for transmission of a maximum quantity of TBs, the maximum quantity including two or more TBs; generating an uplink shared channel message in accordance with the RRC signaling, wherein the uplink shared channel message includes one or more TBs, the one or more TBs being less than the maximum quantity of TBs; and transmitting the uplink shared channel message within an uplink shared channel transmission occasion of the plurality of uplink shared channel transmission occasions.

Aspect 2: The method of aspect 1, further comprising: receiving, via the RRC signaling, additional control signaling, or both, an indication of a first MCS associated with a first TB, and a second MCS associated with a second TB, wherein the uplink shared channel message includes the first TB in the one or more TBs and omits the second TB from the one or more TBs based at least in part on a comparison of the first MCS and the second MCS.

Aspect 3: The method of aspect 2, wherein the uplink shared channel message includes the first TB and omits the second TB based at least in part on the first MCS being greater than the second MCS.

Aspect 4: The method of any of aspects 2 through 3, wherein the uplink shared channel message includes the first TB and omits the second TB based at least in part on the first MCS being the same as the second MCS and on a comparison of transmission layers associated with the first TB and the second TB.

Aspect 5: The method of any of aspects 1 through 4, wherein the uplink shared channel message includes a first TB in the one or more TBs and omits a second TB from the one or more TBs based at least in part on the first TB being associated with a first set of transmission layers and the second TB being associated with a second set of transmission layers.

Aspect 6: The method of aspect 5, wherein the uplink shared channel message includes the first TB and omits the second TB based at least in part on the first set of transmission layers being lower than the second set of transmission layers.

Aspect 7: The method of aspect 6, wherein the first set of transmission layers comprises transmission layers one through four, and the second set of transmission layers comprises transmission layers five through eight.

Aspect 8: The method of any of aspects 1 through 7, wherein the one or more TBs included within the uplink shared channel message includes at least a first TB, the method further comprising: transmitting a UCI message via the first TB of the uplink shared channel message, wherein the UCI message comprises a bit field value that indicates whether a second TB is included within the one or more TBs of the uplink shared channel message.

Aspect 9: The method of aspect 8, wherein the UCI message comprises first information that is common across the first TB and the second TB, second information that is unique to the first TB, and third information that is unique to the second TB.

Aspect 10: The method of aspect 9, wherein the first information comprises a HARQ process identifier, COT sharing information, or both, and the second information comprises a first RV associated with the first TB, a first NDI associated with the first TB, or both, and the third information comprises a second RV associated with the second TB, a second NDI associated with the second TB, or both.

Aspect 11: The method of any of aspects 1 through 10, wherein the one or more TBs included within the uplink shared channel message includes a first TB, the method further comprising: transmitting a first UCI message via the first TB of the uplink shared channel message, wherein the first UCI message comprises first information that is common across the first TB and a second TB, and second information that is unique to the first TB.

Aspect 12: The method of aspect 11, wherein the first UCI message further includes a bit field value indicating that the second TB is included within the one or more TBs of the uplink shared channel message.

Aspect 13: The method of any of aspects 11 through 12, wherein the one or more TBs included within the uplink shared channel message includes the second TB, the method further comprising: transmitting a second UCI message via the second TB of the uplink shared channel message, wherein the second UCI message comprises third information that is unique to the second TB.

Aspect 14: The method of aspect 13, wherein the second UCI message further includes the first information that is common across the first TB and the second TB.

Aspect 15: The method of any of aspects 1 through 14, further comprising: transmitting a second uplink shared channel message within a second uplink shared channel transmission occasion of the plurality of uplink shared channel transmission occasions, wherein the second uplink shared channel message includes the maximum quantity of TBs.

Aspect 16: The method of any of aspects 1 through 15, wherein generating the uplink shared channel message comprises: generating the uplink shared channel message to include less than the maximum quantity of TBs based at least in part on a quantity of uplink traffic within a message buffer at the UE being less than a threshold quantity.

Aspect 17: A method for wireless communication at a network entity, comprising: transmitting RRC signaling that schedules resources for a plurality of uplink shared channel transmission occasions, each of the plurality of uplink shared channel transmission occasions scheduled with a capacity for transmission of a maximum quantity of TBs, the maximum quantity including two or more TBs; and receiving, from a UE, an uplink shared channel message within an uplink shared channel transmission occasion of the plurality of uplink shared channel transmission occasions, wherein the uplink shared channel message includes one or more TBs, the one or more TBs being less than the maximum quantity of TBs.

Aspect 18: The method of aspect 17, further comprising: transmitting, via the RRC signaling, additional control signaling, or both, an indication of a first MCS associated with a first TB, and a second MCS associated with a second TB, wherein the uplink shared channel message includes the first TB in the one or more TBs and omits the second TB from the one or more TBs based at least in part on a comparison of the first MCS and the second MCS.

Aspect 19: The method of aspect 18, wherein the uplink shared channel message includes the first TB and omits the second TB based at least in part on the first MCS being greater than the second MCS.

Aspect 20: The method of any of aspects 18 through 19, wherein the uplink shared channel message includes the first TB and omits the second TB based at least in part on the first MCS being the same as the second MCS and on a comparison of transmission layers associated with the first TB and the second TB.

Aspect 21: The method of any of aspects 17 through 20, wherein the uplink shared channel message includes a first TB in the one or more TBs and omits a second TB from the one or more TBs based at least in part on the first TB being associated with a first set of transmission layers and the second TB being associated with a second set of transmission layers.

Aspect 22: The method of aspect 21, wherein the uplink shared channel message includes the first TB and omits the second TB based at least in part on the first set of transmission layers being lower than the second set of transmission layers.

Aspect 23: The method of aspect 22, wherein the first set of transmission layers comprises transmission layers one through four, and the second set of transmission layers comprises transmission layers five through eight.

Aspect 24: The method of any of aspects 17 through 23, wherein the one or more TBs included within the uplink shared channel message includes at least a first TB, the method further comprising: receiving a UCI message via the first TB of the uplink shared channel message, wherein the UCI message comprises a bit field value that indicates whether a second TB is included within the one or more TBs of the uplink shared channel message.

Aspect 25: The method of aspect 24, wherein the UCI message comprises first information that is common across the first TB and the second TB, second information that is unique to the first TB, and third information that is unique to the second TB.

Aspect 26: The method of aspect 25, wherein the first information comprises a HARQ process identifier, COT sharing information, or both, and the second information comprises a first RV associated with the first TB, a first NDI associated with the first TB, or both, and the third information comprises a second RV associated with the second TB, a second NDI associated with the second TB, or both.

Aspect 27: The method of any of aspects 17 through 26, wherein the one or more TBs included within the uplink shared channel message includes a first TB, the method further comprising: receiving a first UCI message via the first TB of the uplink shared channel message, wherein the first UCI message comprises first information that is common across the first TB and a second TB, and second information that is unique to the first TB.

Aspect 28: The method of aspect 27, wherein the first UCI message further includes a bit field value indicating that the second TB is included within the one or more TBs of the uplink shared channel message.

Aspect 29: The method of any of aspects 27 through 28, wherein the one or more TBs included within the uplink shared channel message includes the second TB, the method further comprising: receiving a second UCI message via the second TB of the uplink shared channel message, wherein the second UCI message comprises third information that is unique to the second TB.

Aspect 30: The method of aspect 29, wherein the second UCI message further includes the first information that is common across the first TB and the second TB.

Aspect 31: The method of any of aspects 17 through 30, further comprising: receiving a second uplink shared channel message within a second uplink shared channel transmission occasion of the plurality of uplink shared channel transmission occasions, wherein the second uplink shared channel message includes the maximum quantity of TBs.

Aspect 32: An apparatus comprising a processor; memory coupled with the processor; and instructions stored in the memory and executable by the processor to cause the apparatus to perform a method of any of aspects 1 through 16.

Aspect 33: An apparatus comprising at least one means for performing a method of any of aspects 1 through 16.

Aspect 34: A non-transitory computer-readable medium storing code the code comprising instructions executable by a processor to perform a method of any of aspects 1 through 16.

Aspect 35: An apparatus comprising a processor; memory coupled with the processor; and instructions stored in the memory and executable by the processor to cause the apparatus to perform a method of any of aspects 17 through 31.

Aspect 36: An apparatus comprising at least one means for performing a method of any of aspects 17 through 31.

Aspect 37: A non-transitory computer-readable medium storing code the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

one or more memories storing processor-executable code; and one or more processors coupled with the one or more memories and individually or collectively operable to execute the code to cause the UE to:

receive radio resource control signaling that indicates resources for a plurality of uplink shared channel transmission occasions, each of the plurality of uplink shared channel transmission occasions configured with a capacity for transmission of a maximum quantity of transport blocks, the maximum quantity including two or more transport blocks;

generate an uplink shared channel message in accordance with the radio resource control signaling, wherein the uplink shared channel message includes one or more transport blocks, the one or more transport blocks being less than the maximum quantity of transport blocks; and transmit the uplink shared channel message within an uplink shared channel transmission occasion of the plurality of uplink shared channel transmission occasions.

2. The apparatus of claim 1, wherein the one or more processors are individually or collectively further operable to execute the code to cause the UE to:

receive, via the radio resource control signaling, additional control signaling, or both, an indication of a first modulation and coding scheme associated with a first transport block, and a second modulation and coding scheme associated with a second transport block, wherein the uplink shared channel message includes the first transport block in the one or more transport blocks and omits the second transport block from the one or more transport blocks based at least in part on a comparison of the first modulation and coding scheme and the second modulation and coding scheme.

3. The apparatus of claim 2, wherein the uplink shared channel message includes the first transport block and omits the second transport block based at least in part on the first modulation and coding scheme being greater than the second modulation and coding scheme.

4. The apparatus of claim 2, wherein the uplink shared channel message includes the first transport block and omits the second transport block based at least in part on the first modulation and coding scheme being the same as the second modulation and coding scheme and on a comparison of transmission layers associated with the first transport block and the second transport block.

5. The apparatus of claim 1, wherein the uplink shared channel message includes a first transport block in the one or more transport blocks and omits a second transport block from the one or more transport blocks based at least in part on the first transport block being associated with a first set of transmission layers and the second transport block being associated with a second set of transmission layers.

6. The apparatus of claim 5, wherein the uplink shared channel message includes the first transport block and omits the second transport block based at least in part on the first set of transmission layers being lower than the second set of transmission layers.

7. The apparatus of claim 6, wherein the first set of transmission layers comprises transmission layers one through four, and wherein the second set of transmission layers comprises transmission layers five through eight.

8. The apparatus of claim 1, wherein the one or more transport blocks included within the uplink shared channel message includes at least a first transport block, wherein the one or more processors are individually or collectively further operable to execute the code to cause the UE to:

transmit an uplink control information message via the first transport block of the uplink shared channel message, wherein the uplink control information message comprises a bit field value that indicates whether a second transport block is included within the one or more transport blocks of the uplink shared channel message.

9. The apparatus of claim 8, wherein the uplink control information message comprises first information that is common across the first transport block and the second transport block, second information that is unique to the first transport block, and third information that is unique to the second transport block.

10. The apparatus of claim 9, wherein the first information comprises a hybrid automatic repeat request process identifier, channel occupancy time sharing information, or both, and wherein the second information comprises a first redundancy version associated with the first transport block, a first new data indicator associated with the first transport block, or both, and wherein the third information comprises a second redundancy version associated with the second transport block, a second new data indicator associated with the second transport block, or both.

11. The apparatus of claim 1, wherein the one or more transport blocks included within the uplink shared channel message includes a first transport block, wherein the one or more processors are individually or collectively further operable to execute the code to cause the UE to:

transmit a first uplink control information message via the first transport block of the uplink shared channel message, wherein the first uplink control information message comprises first information that is common across the first transport block and a second transport block, and second information that is unique to the first transport block.

12. The apparatus of claim 11, wherein the first uplink control information message further includes a bit field value indicating that the second transport block is included within the one or more transport blocks of the uplink shared channel message.

13. The apparatus of claim 11, wherein the one or more transport blocks included within the uplink shared channel message includes the second transport block, wherein the one or more processors are individually or collectively further operable to execute the code to cause the UE to:

transmit a second uplink control information message via the second transport block of the uplink shared channel message, wherein the second uplink control information message comprises third information that is unique to the second transport block.

14. The apparatus of claim 13, wherein the second uplink control information message further includes the first information that is common across the first transport block and the second transport block.

15. The apparatus of claim 1, wherein the one or more processors are individually or collectively further operable to execute the code to cause the UE to:

transmit a second uplink shared channel message within a second uplink shared channel transmission occasion of the plurality of uplink shared channel transmission occasions, wherein the second uplink shared channel message includes the maximum quantity of transport blocks.

16. The apparatus of claim 1, wherein, to generate the uplink shared channel message, the one or more processors are individually or collectively further operable to execute the code to cause the UE to:

generate the uplink shared channel message to include less than the maximum quantity of transport blocks based at least in part on a quantity of uplink traffic within a message buffer at the UE being less than a threshold quantity.

17. An apparatus for wireless communication at a network entity, comprising:

one or more memories storing processor-executable code; and one or more processors coupled with the one or more memories and individually or collectively operable to execute the code to cause the network entity to:

transmit radio resource control signaling that indicates resources for a plurality of uplink shared channel transmission occasions, each of the plurality of uplink shared channel transmission occasions configured with a capacity for transmission of a maximum quantity of transport blocks, the maximum quantity including two or more transport blocks; and receive, from a user equipment (UE), an uplink shared channel message within an uplink shared channel transmission occasion of the plurality of uplink shared channel transmission occasions, wherein the uplink shared channel message includes one or more transport blocks, the one or more transport blocks being less than the maximum quantity of transport blocks.

18. The apparatus of claim 17, wherein the one or more processors are individually or collectively further operable to execute the code to cause the network entity to:

transmit, via the radio resource control signaling, additional control signaling, or both, an indication of a first modulation and coding scheme associated with a first transport block, and a second modulation and coding scheme associated with a second transport block, wherein the uplink shared channel message includes the first transport block in the one or more transport blocks and omits the second transport block from the one or more transport blocks based at least in part on a comparison of the first modulation and coding scheme and the second modulation and coding scheme.

19. The apparatus of claim 18, wherein the uplink shared channel message includes the first transport block and omits the second transport block based at least in part on the first modulation and coding scheme being greater than the second modulation and coding scheme.

20. The apparatus of claim 18, wherein the uplink shared channel message includes the first transport block and omits the second transport block based at least in part on the first modulation and coding scheme being the same as the second modulation and coding scheme and on a comparison of transmission layers associated with the first transport block and the second transport block.

21. The apparatus of claim 17, wherein the uplink shared channel message includes a first transport block in the one or more transport blocks and omits a second transport block from the one or more transport blocks based at least in part on the first transport block being associated with a first set of transmission layers and the second transport block being associated with a second set of transmission layers.

22. The apparatus of claim 21, wherein the uplink shared channel message includes the first transport block and omits the second transport block based at least in part on the first set of transmission layers being lower than the second set of transmission layers.

23. The apparatus of claim 22, wherein the first set of transmission layers comprises transmission layers one through four, and wherein the second set of transmission layers comprises transmission layers five through eight.

24. The apparatus of claim 17, wherein the one or more transport blocks included within the uplink shared channel message includes at least a first transport block, wherein the one or more processors are individually or collectively further operable to execute the code to cause the network entity to:

receive an uplink control information message via the first transport block of the uplink shared channel message, wherein the uplink control information message comprises a bit field value that indicates whether a second transport block is included within the one or more transport blocks of the uplink shared channel message.

25. The apparatus of claim 24, wherein the uplink control information message comprises first information that is common across the first transport block and the second transport block, second information that is unique to the first transport block, and third information that is unique to the second transport block.

26. The apparatus of claim 25, wherein the first information comprises a hybrid automatic repeat request process identifier, channel occupancy time sharing information, or both, and wherein the second information comprises a first redundancy version associated with the first transport block, a first new data indicator associated with the first transport block, or both, and wherein the third information comprises a second redundancy version associated with the second transport block, a second new data indicator associated with the second transport block, or both.

27. The apparatus of claim 17, wherein the one or more transport blocks included within the uplink shared channel message includes a first transport block, wherein the one or more processors are individually or collectively further operable to execute the code to cause the network entity to:

receive a first uplink control information message via the first transport block of the uplink shared channel message, wherein the first uplink control information message comprises first information that is common across the first transport block and a second transport block, and second information that is unique to the first transport block.

28. The apparatus of claim 27, wherein the first uplink control information message further includes a bit field value indicating that the second transport block is included within the one or more transport blocks of the uplink shared channel message.

29. A method for wireless communication at a user equipment (UE), comprising:

receiving radio resource control signaling that indicates resources for a plurality of uplink shared channel transmission occasions, each of the plurality of uplink shared channel transmission occasions configured with a capacity for transmission of a maximum quantity of transport blocks, the maximum quantity including two or more transport blocks;

generating an uplink shared channel message in accordance with the radio resource control signaling, wherein the uplink shared channel message includes one or more transport blocks, the one or more transport blocks being less than the maximum quantity of transport blocks; and transmitting the uplink shared channel message within an uplink shared channel transmission occasion of the plurality of uplink shared channel transmission occasions.

30. A method for wireless communication at a network entity, comprising:

transmitting radio resource control signaling that indicates resources for a plurality of uplink shared channel transmission occasions, each of the plurality of uplink shared channel transmission occasions configured with a capacity for transmission of a maximum quantity of transport blocks, the maximum quantity including two or more transport blocks; and receiving, from a user equipment (UE), an uplink shared channel message within an uplink shared channel transmission occasion of the plurality of uplink shared channel transmission occasions, wherein the uplink shared channel message includes one or more transport blocks, the one or more transport blocks being less than the maximum quantity of transport blocks.

* * * * *